United States Patent
Kim et al.

(10) Patent No.: US 11,817,619 B2
(45) Date of Patent: Nov. 14, 2023

(54) ELECTRONIC DEVICE INCLUDING ISOLATED CONDUCTOR

(71) Applicant: Samsung Electronics Co., Ltd., Suwon-si (KR)

(72) Inventors: Jongmin Kim, Suwon-si (KR); Yongwoog Shin, Suwon-si (KR); Sangho Hong, Suwon-si (KR); Muchang Son, Suwon-si (KR); Kyungtai Lee, Suwon-si (KR); Yanghoon Lim, Suwon-si (KR); Kyonghwan Cho, Suwon-si (KR); Joseph Kang, Suwon-si (KR); Jiyeon Yun, Suwon-si (KR); Jongsuk Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 16/953,702

(22) Filed: Nov. 20, 2020

(65) Prior Publication Data
US 2021/0151856 A1 May 20, 2021

(30) Foreign Application Priority Data
Nov. 20, 2019 (KR) .................. 10-2019-0149895

(51) Int. Cl.
*H01Q 1/24* (2006.01)
*H04M 1/02* (2006.01)

(52) U.S. Cl.
CPC .......... *H01Q 1/243* (2013.01); *H04M 1/0266* (2013.01); *H04M 1/0277* (2013.01)

(58) Field of Classification Search
CPC ... H01Q 1/243; H04M 1/0266; H04M 1/0277
See application file for complete search history.

(56) References Cited

U.S. PATENT DOCUMENTS

| 8,054,231 B2 | 11/2011 | Ahn et al. |
| 10,608,324 B2 | 3/2020 | Lee et al. |

(Continued)

FOREIGN PATENT DOCUMENTS

| KR | 10-1501921 B1 | 3/2015 |
| KR | 10-1641486 B1 | 7/2016 |

(Continued)

OTHER PUBLICATIONS

International Search Report dated Mar. 18, 2021, issued in International Application No. PCT/KR2020/016504.

(Continued)

*Primary Examiner* — Henry Luong
(74) *Attorney, Agent, or Firm* — Jefferson IP Law, LLP

(57) ABSTRACT

An electronic device including an isolated conductor is provided. The electronic device includes a display panel including a first surface facing a first direction and a second surface facing a second direction, a first printed circuit board which is positioned in the second direction of the display panel and includes a first ground unit, a bracket including a first structure which forms a side surface of the electronic device and a second structure which forms a space in which electronic components are mounted, a wireless communication circuit which is electrically connected to the first metal region, and a second printed circuit board including a second ground unit, wherein the first structure of the bracket includes a first metal region, the second structure of the bracket includes a second metal region, a first non-metal region, and a third metal region extending through one region of the first non-metal region.

16 Claims, 19 Drawing Sheets

(56) References Cited

U.S. PATENT DOCUMENTS

| | | | |
|---|---|---|---|
| 11,343,914 B2 | 5/2022 | Son et al. | |
| 2017/0244818 A1* | 8/2017 | Kim | H01Q 5/335 |
| 2017/0273173 A1 | 9/2017 | Ikuta | |
| 2018/0017999 A1 | 1/2018 | Kim et al. | |
| 2018/0090821 A1 | 3/2018 | Lee et al. | |
| 2018/0331418 A1* | 11/2018 | Kim | H01Q 1/243 |
| 2019/0067795 A1* | 2/2019 | Shin | H01Q 1/2283 |
| 2019/0261515 A1 | 8/2019 | Son et al. | |
| 2020/0383247 A1 | 12/2020 | Jin et al. | |

FOREIGN PATENT DOCUMENTS

| | | |
|---|---|---|
| KR | 10-2018-0031120 A | 3/2018 |
| KR | 10-2018-0035605 A | 4/2018 |
| KR | 10-2018-0124621 A | 11/2018 |
| KR | 10-2019-0060305 A | 6/2019 |
| KR | 10-2019-0100638 A | 8/2019 |

OTHER PUBLICATIONS

Korean Office Action dated Sep. 12, 2023, issued in Korean Application No. 10-2019-0149895.

\* cited by examiner

ELECTRONIC DEVICE INCLUDING ISOLATED CONDUCTOR

CROSS-REFERENCE TO RELATED APPLICATION(S)

This application is based on and claims priority under 35 U.S.C. § 119(a) of a Korean patent application number 10-2019-0149895, filed on Nov. 20, 2019, in the Korean Intellectual Property Office, the disclosure of which is incorporated by reference herein in its entirety.

BACKGROUND

1. Field

The disclosure relates to an electronic device including an isolated conductor.

2. Description of Related Art

In order to perform various functions, an electronic device includes antennas supporting various frequency bands. The electronic device may include multiple antennas for performing, for example, cellular communication (e.g., long term evolution (LTE) or 5th generation (5G)) or short-range communication (e.g., wireless fidelity (Wi-Fi) or Bluetooth).

The electronic device may transmit and/or receive a voice signal or a radio frequency (RF) signal including data (e.g., a message, a photo, a video, a music file, or a game) by using the multiple antennas.

The above information is presented as background information only to assist with an understanding of the disclosure. No determination has been made, and no assertion is made, as to whether any of the above might be applicable as prior art with regard to the disclosure.

SUMMARY

Recently, electronic devices, such as smartphones have been designed to have a narrow bezel region in order to secure the maximum screen size while maintaining the size of the devices to be small.

The electronic device may include a side member made of a metal material, wherein one region of the metal material may be used as an antenna. As the bezel region of the electronic device becomes narrower, a display panel may be positioned adjacent to the metal side member.

As the display is positioned more adjacent to the metal side member of the electronic device, which is used as an antenna, parasitic resonance is generated between the display and the antenna, whereby the efficiency of the antenna can be reduced.

In order to prevent the parasitic resonance from being generated between the display and the antenna, the display is to be spaced apart from the side member of the electronic device. However, when the display is spaced apart from the side member, the entire thickness of the electronic device can increase, or the aesthetic property of the electronic device can deteriorate.

Accordingly, there is a need for a new method in which the generation of the parasitic resonance between the display and the antenna can be prevented while the display is not spaced apart from the side member of the electronic device.

Aspects of the disclosure are to address at least the above-mentioned problems and/or disadvantages and to provide at least the advantages described below. Accordingly, an aspect of the disclosure is to provide an electronic device, wherein the electronic device may form an electrical path between grounds of an antenna and a display through an island metal structure, thereby reducing the parasitic resonance generated between the display and the antenna.

Additional aspects will be set forth in part in the description which follows and, in part, will be apparent from the description, or may be learned by practice of the presented embodiments.

In accordance with an aspect of the disclosure, an electronic device is provided. The electronic device includes a display panel including a first surface facing a first direction and a second surface facing a second direction, a first printed circuit board configured to be positioned in the second direction of the display panel and to include a first ground unit, a bracket including a first structure which forms a side surface of the electronic device and a second structure which forms a space in which electronic components are mounted, wherein the first structure of the bracket includes a first metal region operating as a radiator and insulation regions positioned at both ends of the first metal region, and the second structure of the bracket includes a second metal region, a first non-metal region, and a third metal region extending through one region of the first non-metal region, a wireless communication circuit which is electrically connected to the first metal region and is configured to transmit or receive at least one signal having a designated frequency, and a second printed circuit board including a second ground unit, wherein the first metal region is electrically connected to the second printed circuit board, and the third metal region is electrically connected to the first ground unit and the second ground unit.

In accordance with another aspect of the disclosure, an electronic device is provided. The electronic device includes a housing, wherein the housing includes an antenna radiator functioning as a radiator, a metal region, and an island metal spaced apart from the antenna radiator and the metal region, a display panel configured to be positioned in the housing and to include a first surface facing a first direction and a second surface facing a second direction, a first printed circuit board configured to be positioned in the second direction of the display panel and to include a first ground unit, a wireless communication circuit which is electrically connected to the antenna radiator and is configured to transmit or receive at least one signal having a designated frequency, and a second printed circuit board configured to be positioned in the housing and to include a second ground unit, wherein the antenna radiator is electrically connected to the second printed circuit board, the island metal is electrically connected to the first ground unit and the second ground unit through at least one electrical connection unit, and an electrical path is formed among the antenna radiator, the second ground unit, the island metal, and the first ground unit.

According to an embodiment of the disclosure, an electronic device may form an electrical path to ground units of an antenna and a display through an island metal structure, thereby extending a ground of the antenna.

Further, an electronic device according to an embodiment of the disclosure may form an electrical path to ground units of an antenna and a display, thereby reducing the parasitic resonance generated by the display, and, accordingly, improving the efficiency of the antenna.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
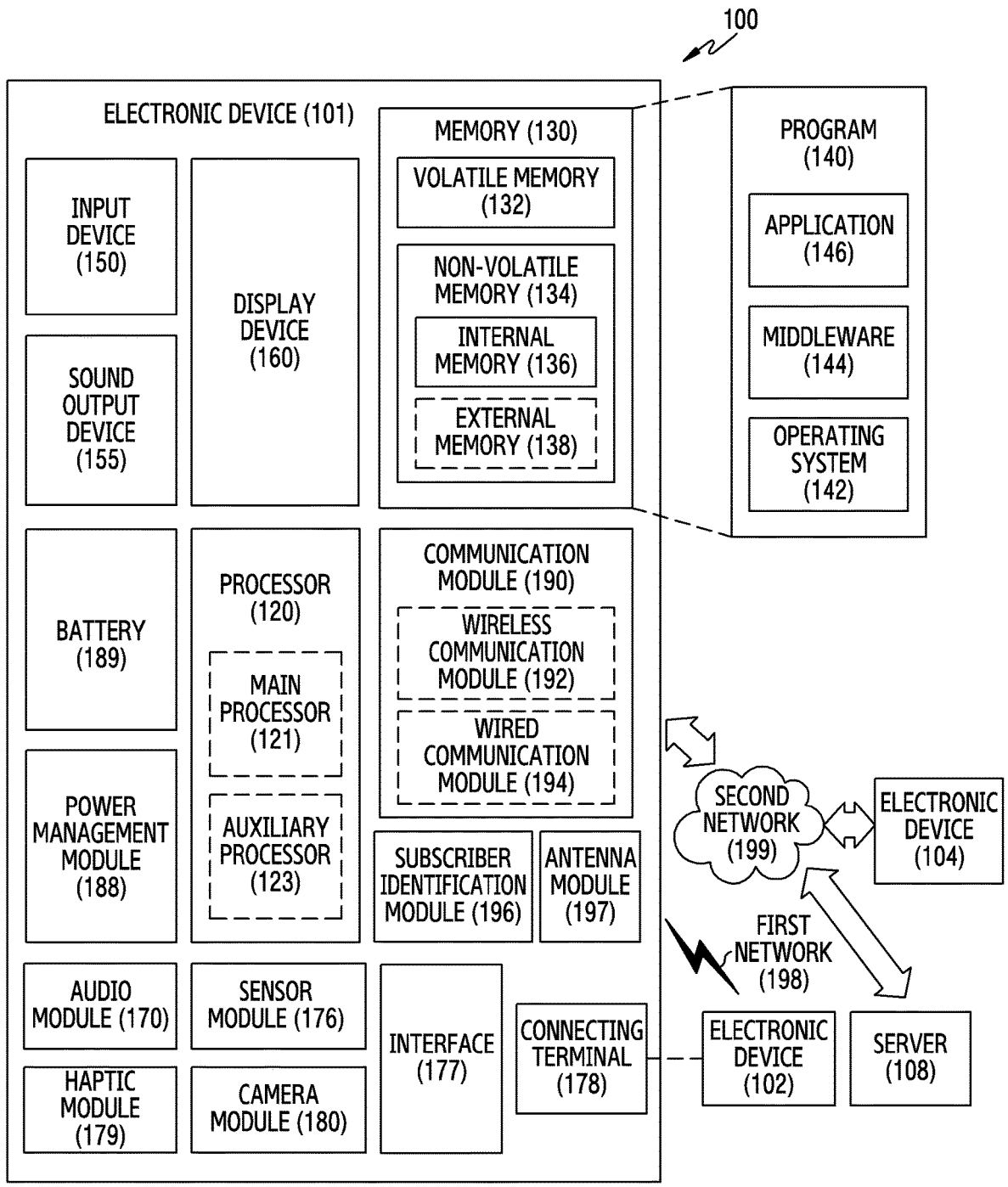
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture an image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a PCB). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smailphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2A:
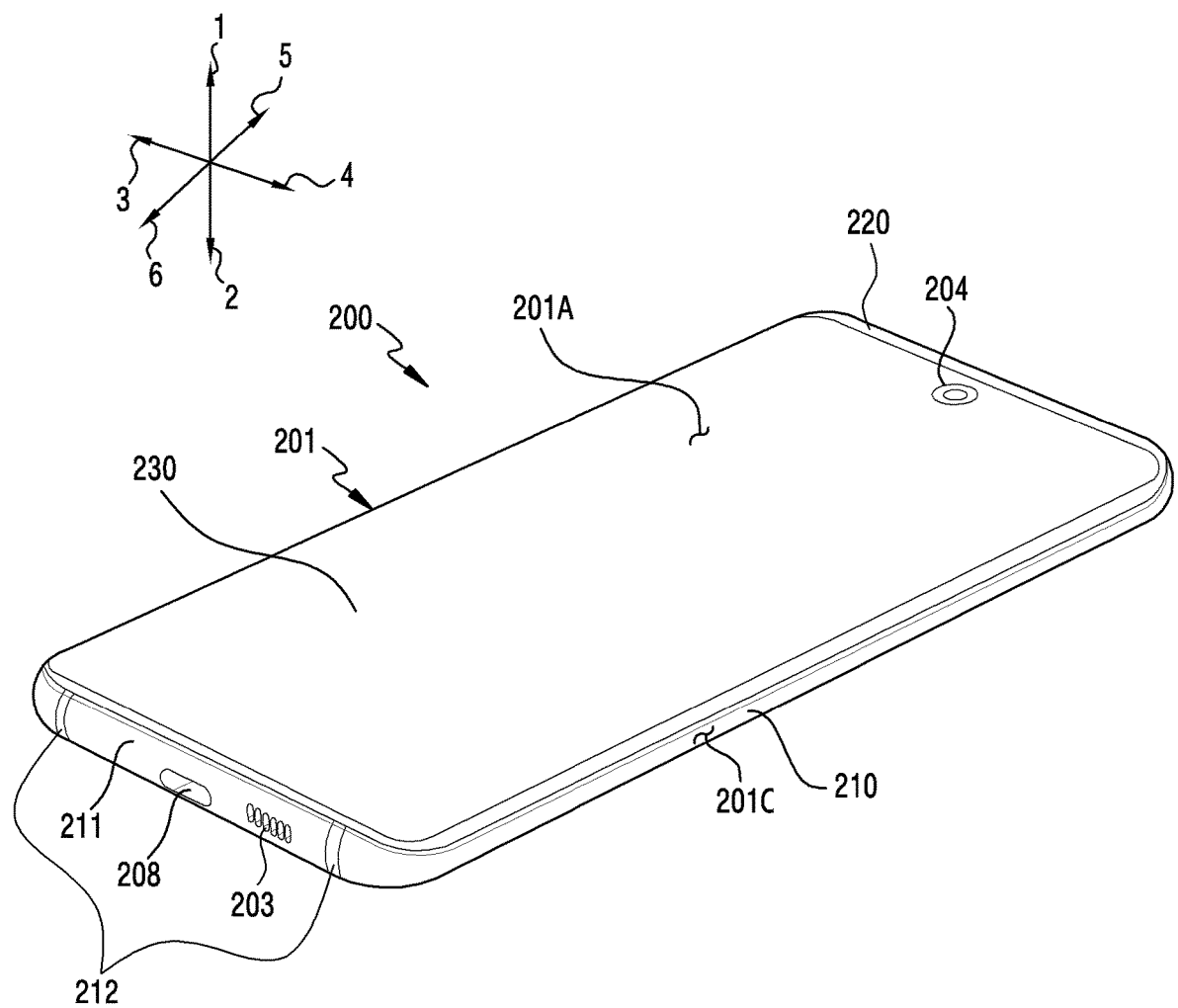
FIG. 2A is a perspective view of an electronic device according to an embodiment of the disclosure.
Figure 2B:
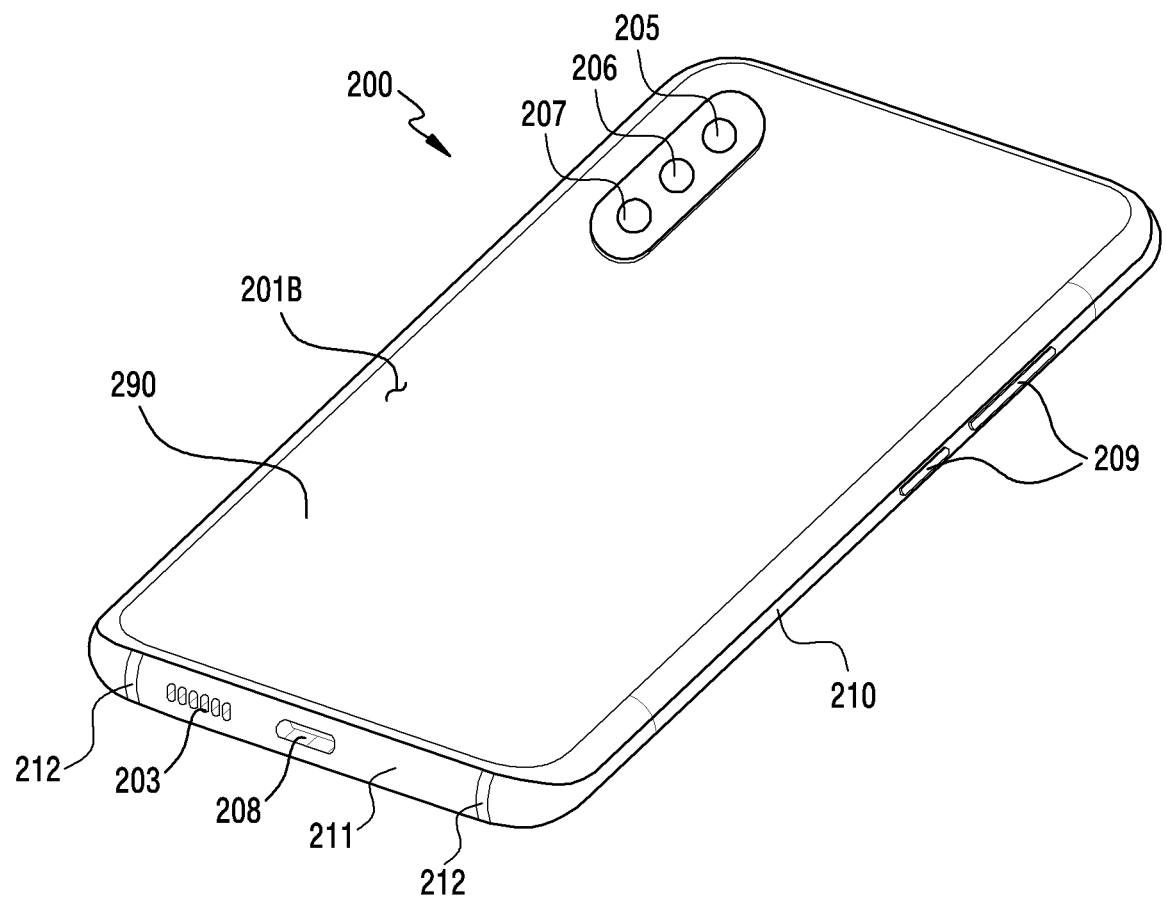
FIG. 2B is a rear perspective view of an electronic device of FIG. 2A according to an embodiment of the disclosure.

FIG. 2A is a perspective view of an electronic device 200 according to an embodiment of the disclosure. FIG. 2B is a rear perspective view of the electronic device 200 of FIG. 2A according to an embodiment of the disclosure.

Referring to FIGS. 2A and 2B, an electronic device 200 (e.g., the electronic device 101 of FIG. 1) according to an embodiment of the disclosure may include a housing 201 including a first surface (or a front surface) 201A facing a first direction 1, a second surface (or a rear surface) 201B facing a second direction 2 that is opposite to the first direction 1, and a side surface (or a side wall) 201C surrounding a space between the first surface 201A and the second surface 201B. According to another embodiment (not shown), the housing 201 may refer to a structure forming a part of the first surface 201A, the second surface 201B, and the side surface 201C of the FIGS. 2A and 2B.

According to an embodiment of the disclosure, the first surface 201A may be formed by a front plate 220 (e.g., a polymer plate or a glass plate including various coating layers), at least a part of which is substantially transparent. According to an embodiment of the disclosure, the front plate 220 may include a curved part that is bent and seamlessly extends from the first surface 201A toward a rear plate 290.

According to an embodiment of the disclosure, the second surface 201B may be formed by the rear plate 290 that is substantially opaque. The rear plate 290 may be formed of, for example, coated or colored glass, ceramic, a polymer, or metal (e.g., aluminum, stainless steel (STS), or magnesium), or by a combination of two or more of the above-mentioned materials. According to an embodiment of the disclosure, the rear plate 290 may include a curved part that is bent and seamlessly extends from the second surface 201B toward the front plate 220.

According to an embodiment of the disclosure, the side surface 201C may be formed by a first structure 210 of a supporting member (or a "bracket"). According to an embodiment of the disclosure, the first structure 210 of the supporting member may include metal and/or a polymer and may be coupled to the front plate 220 and the rear plate 290. In another example, the first structure 210 may be integrally formed with the rear plate 290 and may include the same material (e.g., a metal material, such as aluminum) as that of the rear plate 290.

The first structure 210 according to an embodiment of the disclosure may include a metal region 211 and at least one insulation region 212. According to an embodiment of the disclosure, the metal region 211 may operate as a radiator. According to an embodiment of the disclosure, the metal region 211 may be electrically connected to a wireless communication circuit (e.g., the communication module 190 of FIG. 1) and may radiate a radio frequency (RF) signal supplied from the wireless communication circuit to the outside of the electronic device 200.

According to an embodiment of the disclosure, the insulation regions 212 may be positioned at both ends of the metal region 211 operating as a radiator, and the metal region 211 and the other regions of the first structure 210 may be electrically separated from one another by the insulation regions 212.

The electronic device 200 according to an embodiment of the disclosure may include at least one of a display panel 230, an audio module (i.e., a speaker hole 203), a sensor module (not shown), a camera module 204, 205, 206, or 207, a connector hole 208, and/or a key input device 209. According to another embodiment (not shown), the electronic device 200 may omit at least one (e.g., the key input device 209) of the above-described components, or may additionally include another component.

According to an embodiment of the disclosure, the display panel 230 may be exposed to the outside of the electronic device 200 through at least one region of the front plate 220. In one example, the edge of the display panel 230 may be formed to have substantially the same shape as that (e.g., a curved shape) of an adjacent outer edge of the front plate 220. In another example, in order to extend an area where the display panel 200 is exposed to the outside of the electronic device 200, an interval between the outer edge of the display panel 230 and the outer edge of the front plate 220 may be formed to be substantially the same. The electronic device 200 according to another example may include a recess or an opening at a part of a screen display region of the display panel 230, and may include another electronic component (e.g., the camera module 204, a proximity sensor, or an illuminance sensor) aligned with the recess and the opening.

According to an embodiment of the disclosure, a rear surface (e.g., the second surface (or the rear surface) 201B facing the second direction 2) of the screen display region of the display panel 230 may include at least one of a camera module 205, 206, or 207 and/or a fingerprint sensor (not shown). In another embodiment (not shown), the display panel 230 may be positioned to be coupled with, or adjacent to, a touch detecting circuit, a pressure sensor capable of measuring the strength (pressure) of a touch, and/or a digitizer for detecting a magnetic field-type stylus pen.

Although not shown in the drawing, the electronic device 200 according to an embodiment of the disclosure may further include a light-emitting element, and the light-emitting element may be positioned adjacent to the display panel 230 in a region provided by the front plate 220. For example, the light-emitting element may provide information on the state of the electronic device 200 in the form of light. In another embodiment of the disclosure, the light-emitting element may provide, for example, a light source that interacts with an operation of the camera module. The light-emitting element may include at least one of an LED, an IR LED, and a xenon lamp.

According to an embodiment of the disclosure, the audio module may include a microphone hole (not shown) and a speaker hole 203. The microphone hole may have a microphone inside thereof to obtain external sounds, and, in an embodiment of the disclosure, may have a plurality of microphones to detect the direction of a sound. In an embodiment of the disclosure, the speaker hole 203 and the microphone hole may be implemented as a single hole, or only a speaker (e.g., a piezo speaker) may be included without a separate speaker hole.

According to an embodiment of the disclosure, the electronic device 200 may include a sensor module (e.g., a proximity sensor or an illuminance sensor). In an example, the sensor module may be positioned in a region adjacent to the display panel 230. However, the position of the sensor module is not limited to the above-described embodiment of the disclosure, and the sensor module according to another embodiment may be positioned on a rear surface of the display panel 230 in a region provided by the front plate 220 so as to be positioned as integrated with the display panel 230.

The electronic device 200 may include a sensor module not shown in the drawing and may generate a data value or an electrical signal corresponding to an internal operational state or an external environment state. The sensor module according to an embodiment of the disclosure may further include a fingerprint sensor positioned to be integrated with, or adjacent to the display panel 230, and/or a biometric sensor (e.g., an HRM sensor) positioned on the second surface 201B of the housing 201. According to another embodiment of the disclosure, the electronic device 200 may further include a sensor module that is not shown, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera module 204, 205, 206, or 207 according to an embodiment of the disclosure may include a first camera device 204 positioned on the first surface 201A of the electronic device 200, a second camera device 205 or 206 positioned on the second surface 201B, and/or a flash 207. According to an embodiment of the disclosure, the camera devices 204, 205, and 206 may include one or more lenses, an image sensor, and/or an image signal processor. The flash 207 according to an embodiment of the disclosure may include a light-emitting diode or a xenon lamp. In another embodiment of the disclosure, two or more lenses (an infrared camera, a wide-angle lens, and a telescopic lens) and image sensors may be positioned on one surface (e.g., the first surface 201A or the second surface 201B) of the electronic device 200.

According to an embodiment of the disclosure, at least one key input device 209 may be positioned on the side surface 201C of the housing 201. In another embodiment of the disclosure, the electronic device 200 may not include some or all of the above-described key input device 209, and the key input device 209 that is not included may be implemented on the display panel 230 in other forms, such as a soft key. According to another embodiment of the disclosure, the key input device 209 may include at least part of the fingerprint sensor.

According to an embodiment of the disclosure, the connector hole 208 may include a first connector hole capable of receiving a connector (for example, a USB connector) for transmitting or receiving power and/or data to or from an external electronic device, and/or a second connector hole (for example, an earphone jack) capable of receiving a connector for transmitting or receiving an audio signal to or from an external electronic device. In one embodiment of the disclosure, the first connector hole and the second connector hole may be implemented as a single hole. In one embodiment of the disclosure, the electronic device 200 may transmit or receive power and/or data, or may transmit or receive an audio signal to or from an external electronic device without a connector hole.

Figure 3:
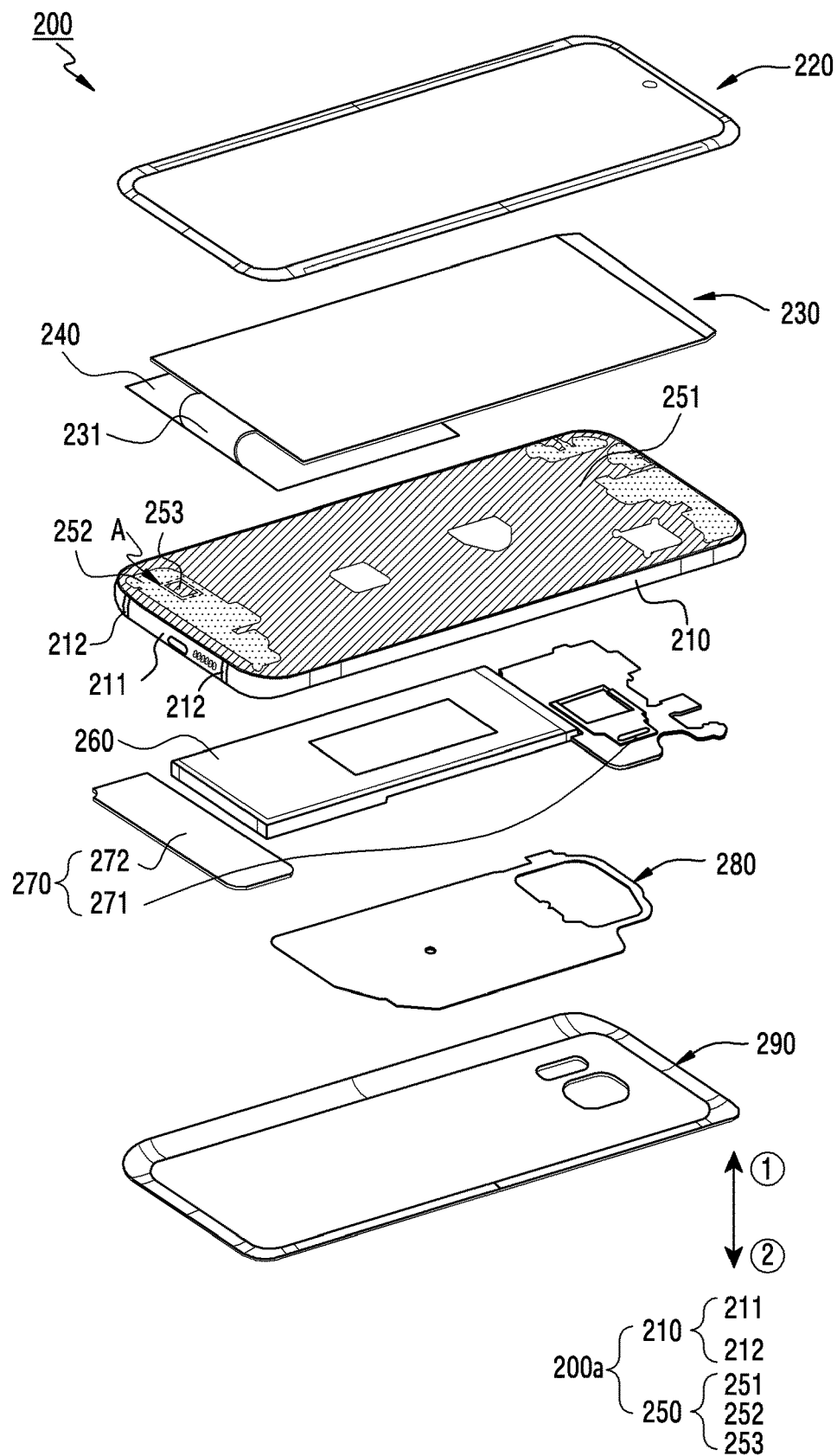
FIG. 3 is an exploded perspective view of an electronic device according to an embodiment of the disclosure.

FIG. 3 is an exploded perspective view of an electronic device 200 according to an embodiment of the disclosure.

Referring to FIG. 3, an electronic device 200 (e.g., the electronic device 101 of FIG. 1 or the electronic device 200 of the FIGS. 2A and 2B) according to an embodiment of the disclosure may include a front plate 220 (e.g., the front plate 220 of FIG. 2A), a display panel 230 (e.g., the display panel 230 of FIG. 2A), a flexible printed circuit board 231, a first printed circuit board 240, a bracket 200a (or a "supporting member") including a first structure 210 and a second structure 250, a battery 260, a second printed circuit board 270, a short-range communication circuit 280, and/or a rear plate 290 (e.g., the rear plate 290 of FIG. 2B). The electronic device 200 according to an embodiment of the disclosure may omit at least one of the above-described components, or may additionally include another component (e.g., a rear case). At least one of components of the electronic device 200 of FIG. 3 may be the same as or similar to at least one of components of the electronic device 200 of FIGS. 2A and 2B, and, hereinafter, the duplicated description will be omitted.

According to an embodiment of the disclosure, the display panel 230 may be positioned between the front plate 220 and the second structure 250 of the bracket. At least a part of a region of the display panel 230 may be supported by one surface (e.g., a surface facing direction ① of FIG. 3) of the second structure 250 in the electronic device 200. The display panel 230 may emit light from a pixel to transmit information to a user, and the light emitted from the pixel may be transmitted to the outside of the electronic device 200 through the front plate 220.

According to an embodiment of the disclosure, the first printed circuit board 240 may be positioned on a rear surface (e.g., in direction ② of FIG. 3) of the display panel 230, and may include a first ground unit (or a "first ground"). In an example, the first printed circuit board 240 may be supported by the bracket 200a, and may be electrically connected to the display panel 230 through a flexible printed circuit board 231 functioning as a connector. The first ground unit may serve as a ground of the display panel 230, and may block electromagnetic waves introduced to the display panel 230 or discharged from the display panel 230. In an example, the first ground unit may be a ground layer made of metal (e.g., copper (Cu)), but is not limited thereto.

According to an embodiment of the disclosure, the bracket 200a may include a first structure 210 forming a side surface (e.g., the side surface 201C of FIG. 2A) of the electronic device 200 and a second structure 250 forming a space in which a component (e.g., an electronic component) of the electronic device 200 is mounted.

In an example, the first structure 210 may include a first metal region 211 (e.g., the metal region 211 of the FIG. 2A) and insulation regions 212 (e.g., the insulation regions 212 of FIG. 2A). The first metal region 211 may be electrically connected to a wireless communication circuit (e.g., the communication module 190 of FIG. 1), and may operate as a radiator for radiating an RF signal supplied from the wireless communication circuit to the outside of the electronic device 200. The insulation regions 212 may be positioned at both ends of the first metal region 211, and may electrically insulate the first metal region 211 from other metal regions of the first structure 210.

In an example, the second structure 250 may be connected to the first structure 210. For example, the second structure 250 may be formed to have a structure in which the second structure 250 is positioned in the first structure 210 and the circumferential surface of the second structure 250 is connected to the first structure 210. The second structure 250 may include a second metal region 251, a non-metal region 252, and a third metal region 253. The second metal region 251 may provide a space in which electronic components (e.g., the display panel 230, the first printed circuit board 240, and the second printed circuit board 270) of the electronic device 200 can be mounted, and the electronic components may be supported by the second metal region 251. The non-metal region 252 may be positioned on one region of the second structure 250, which is adjacent to the second metal region 251, and may be made of a polymer (e.g., polycarbonate). The third metal region 253 may extend through one region A of the non-metal region 252. The third metal region 253 may extend through the one region A of the non-metal region 252, wherein the third metal region 253 is surrounded by the non-metal region 252, and, accordingly, the third metal region 253 and the second metal region 251 may be spaced apart from each other. The third metal region 253 may serve as a medium of an electrical path for extending the ground of the first metal region 211 operating as a radiator to the first ground unit of the first printed circuit board 240. According to an embodiment of the disclosure, the first metal region 211 constituting the first structure 210 and the second metal region 251 and the third metal region 253 constituting the second structure 250 of the bracket 200a may be made of the same metal material, and the detailed description thereof will be made later.

According to an embodiment of the disclosure, the second printed circuit board 270 may be positioned on one surface (e.g., a surface facing direction ② of FIG. 3) of the second structure 250 (e.g., the second metal region 251), wherein the first printed circuit board 240 may be positioned at the upper side (e.g., in direction ① of FIG. 3) with reference to the second structure 250, and the second printed circuit board 270 may be positioned at the lower side (e.g., in direction ② of FIG. 3) thereof. A processor (e.g., the processor 120 of FIG. 1), a memory (e.g., the memory 130 of FIG. 1), a wireless communication circuit (e.g., the communication module 190 of FIG. 1), and/or an interface (e.g., the interface 177 of FIG. 1) may be mounted on the second printed circuit board 270.

For example, the processor may include one or more of a central processing unit, an application processor, a graphics processing unit, an image signal processor, a sensor hub processor, or a communication processor. The wireless communication circuit may communicate with an external electronic device (e.g., the electronic device 102 of FIG. 1). The memory may include, for example, volatile memory or non-volatile memory. The interface may electrically or physically connect the electronic device 200 to an external electronic device, and the interface according to an embodiment of the disclosure may include a USB connector, a SD card/MMC connector, or an audio connector.

According to an embodiment of the disclosure, the second printed circuit board 270 may include a second ground unit (or a "second ground"). The second ground unit of the second printed circuit board 270 may function as a ground of an antenna implemented through a wireless communication circuit.

According to an embodiment of the disclosure, the second printed circuit board 270 may include a main printed circuit board and a sub-printed circuit board (i.e., a feeding unit 272) connected through the main printed circuit board and a connector (e.g., a board to board connector (B to B connector)). According to another embodiment (not shown), the second printed circuit board 270 may include one printed circuit board.

According to an embodiment of the disclosure, the battery 260 is a device for supplying power to at least one component of the electronic device 200, and may include a primary cell which is not rechargeable, a secondary cell which is rechargeable, or a fuel cell. In one example, the first printed circuit board 270 may have an opening, and at least a part of a region of the battery 260 may be positioned on substantially the same plane as the second printed circuit board 270. According to an embodiment of the disclosure, the battery 260 may be integrally positioned in the electronic device 200, or may be detachably positioned in the electronic device 200.

According to an embodiment of the disclosure, the short-range communication circuit 280 may perform short-range communication with an external electronic device, or may wirelessly transmit or receive power required for charging. For example, the short-range communication circuit 280 may be implemented as near-field communication (NFC) or magnetic secure transmission (MST).

In an embodiment of the disclosure, the rear plate 290 may form a rear surface (e.g., the rear surface 201B of FIG. 2B) of the electronic device 200. The rear plate 290 may protect the electronic device 200 from an impact or a foreign material from the outside.

Figure 4:
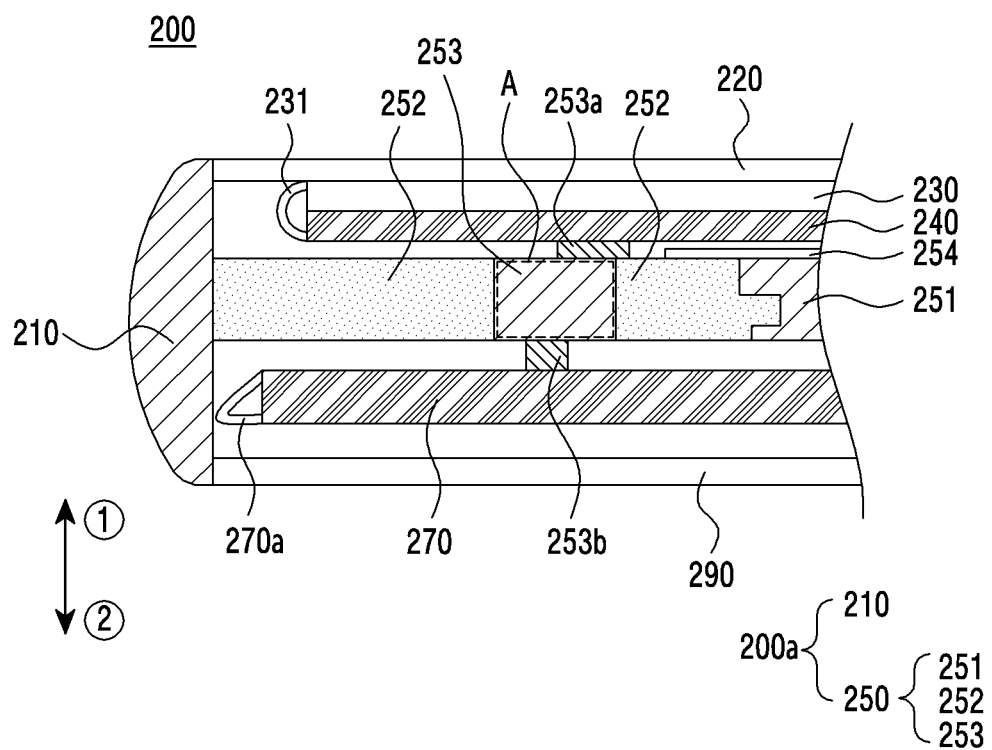
FIG. 4 is a sectional view of an electronic device according to an embodiment of the disclosure.

FIG. 4 is a sectional view of an electronic device 200 according to an embodiment of the disclosure. In the disclosure, FIG. 4 illustrates a cross-section of a lower end region (e.g., a region in direction 6 of FIG. 2A) among cross-sections of the electronic device 200.

Referring to FIG. 4, an electronic device 200 according to an embodiment of the disclosure may include a front plate 220 (e.g., the front plate 220 of FIG. 3), a display panel 230 (e.g., the display panel 230 of FIG. 3), a flexible printed circuit board 231 (e.g., the flexible printed circuit board 231 of FIG. 3), a first printed circuit board 240 (e.g., the first printed circuit board 240 of FIG. 3), a bracket 200a (e.g., the bracket 200a of FIG. 3) including a first structure 210 (e.g., the first structure 210 of FIG. 3) and a second structure 250 (e.g., the second structure 250 of FIG. 3), a second printed circuit board 270 (e.g., the second printed circuit board 270 of FIG. 3), a rear plate 290, at least one electrical connection unit (e.g., 253a, 253b, and 270a), and/or a wireless communication circuit (not shown) (e.g., the communication module 190 of FIG. 1). At least one of components of the electronic device 200 of FIG. 4 may be the same as or similar to at least one the components of the electronic device 200 of FIG. 3, and, hereinafter, the duplicated description will be omitted.

According to an embodiment of the disclosure, the first structure 210 of the bracket 200a may form a side surface region of the electronic device 200. At least one region (e.g., a first metal region 211 of FIG. 3) of the first structure 210 may be made of a conductive material. The above-described at least one region of the first structure 210 may operate as a radiator, and may be electrically connected to a feeding unit positioned on the second printed circuit board 270 and be used as an antenna radiator. In one example, the at least one region of the first structure 210 made of a conductive material may receive a signal in a designated frequency band from the feeding unit, and may radiate the signal to the outside of the electronic device 200.

According to an embodiment of the disclosure, the first printed circuit board 240 may be electrically connected to the display panel 230 through the flexible printed circuit board 231. The first printed circuit board 240 may be positioned at the upper end (e.g., in direction ① of FIG. 4) of the second structure 250 of the bracket 200a, and may include a first ground unit (or a "first ground"). The first ground unit may block electromagnetic waves introduced to the display panel 230 or discharged from the display panel 230.

According to an embodiment of the disclosure, the second printed circuit board 270 may be positioned at the lower end (e.g., in direction ② of FIG. 4) of the second structure 250 of the bracket 200a. In one example, the second printed circuit board 270 may include a feeding unit, a second ground unit (or a "second ground"), a wireless communication circuit (e.g., the communication module 190 of FIG. 1), and/or a processor (e.g., the processor 120 of FIG. 1).

For example, the feeding unit may be a feeding circuit including an radio frequency (RF) circuit for transmitting and/or receiving an RF signal, a tuner for controlling a central frequency of the RF circuit, and/or a switch for controlling input or output of the RF signal. The feeding unit may be operatively connected to the processor and/or the wireless communication circuit positioned on the second printed circuit board 270. The feeding unit may be electrically connected to the above-described one region of the first structure 210 through a first electrical connection unit 270a and feed power to the one region of the first structure 210. The first electrical connection unit 270a may be implemented as a C-clip, a metal wiring, or a coaxial cable, but is not limited thereto.

The second ground unit may be electrically separated from the feeding unit through an insulation layer (not shown), and may be used as an antenna ground according to an embodiment. For example, the one region (e.g., the first metal region 211 of FIG. 3) of the first structure 210 made of a conductive material, the feeding unit, and the second ground unit may implement a planar inverted-F antenna (PIFA), and the second ground part may function as a ground of the PIFA.

According to an embodiment of the disclosure, the second structure 250 of the bracket 200a may include a second metal region 251, a non-metal region 252, and a third metal region 253.

The second metal region 251 may form a space in which electronic components (e.g., the display panel 230, the first printed circuit board 240, or the second printed circuit board 270) are mounted, and may support the electronic components. For example, in order to prevent the first ground unit of the first printed circuit board 240 from being electrically connected to the second metal region 251 supporting the first printed circuit board 240, an anodizing process may be applied to at least a part of one surface of the second metal region 251 facing the first printed circuit board 240 to insulate the first printed circuit board 240 from the second metal region 251. In another example, insulation tape 254 may be attached to at least a part of one surface of the second metal region 251 facing the first printed circuit board 240 to insulate the first printed circuit board 240 from the second metal region 251. Here, the insulation tape 254 may be attached to the second metal region 251 only, but a part of a region of the insulation tape 254 may be attached to at least one region of the non-metal region 252.

The non-metal region 252 may separate the third metal region 253 from the second metal region 251 and one region (e.g., the first metal region 211 of FIG. 3) of the first structure 210. The third metal region 253 may extend through one region A of the non-metal region 252 and may be positioned to be surrounded by the non-metal region 252.

The third metal region 253 may be positioned to be spaced apart from the second metal region 251 and one region (e.g., the first metal region 211 of FIG. 3) of the first structure 210 through the non-metal region 252 so as to form an island metal structure. In various embodiments of the disclosure, the island metal structure may mean a structure including a region of a conductor, isolated or secluded from other conductors (e.g., the first metal region 211 of FIG. 3 and the second metal region 252), and, hereinafter, the island metal structure may be used to have the same meaning Through the above-described island metal structure, the third metal region 253 may serve as a medium for extending a ground of the PIFA implemented through the one region of the first structure 210, the feeding unit, and the second ground unit. According to an embodiment of the disclosure, the third metal region 253 may be positioned between the first printed circuit board 240 and the second printed circuit board 270, and may be electrically connected to the first ground unit of the first printed circuit board 240 and the second ground unit of the second printed circuit board 270.

In one example (not shown), a part of a region of the third metal region 253 may project toward the first printed circuit board 240 and come into direct contact with the first ground unit of the first printed circuit board 240 so that the third metal region 253 is electrically connected to the first ground unit. In another example, the third metal region 253 may be electrically connected to the first ground unit through a second electrical connection unit 253a. Similarly, the third metal region 253 may be electrically connected to the second ground unit by coming into direct contact with the second ground unit of the second printed circuit board 270, or through a third electrical connection unit 253b. The second electrical connection unit 253a and the third electrical connection unit 253b may be implemented as one of, for example, a conductive gasket, a conductive sponge, a C-clip, a metal wiring, a pogo pin, a screw, or conductive tape. However, the second electrical connection unit 253a and the third electrical connection unit 253b are not limited to the above-described embodiment of the disclosure, and may be implemented as other conductive or variable (or pressable) materials.

As the third metal region 253 is electrically connected to the first ground unit of the first printed circuit board 240 and the second ground unit of the second printed circuit board 270, an electrical path may be formed among the one region (e.g., the first metal region 211 of FIG. 3) of the first structure 210, the second ground unit of the second printed circuit board 270, the third metal region 253, and the first ground unit of the first printed circuit board 240. Through the electrical path, the ground of the PIFA implemented through the one region of the first structure 210, the feeding unit, and the second ground unit may be extended to the first ground unit used as a ground of the display panel 230. However, the detailed description thereof will be made later.

The one region of the first structure 210 and the second metal region 251 and the third metal region 253 of the second structure 250, which are formed as conductors in the electronic device 200 according to an embodiment of the disclosure, may be made of the same material. The detailed description thereof will be made later with reference to FIGS. 5 and 6A to 6D.

Figure 5:
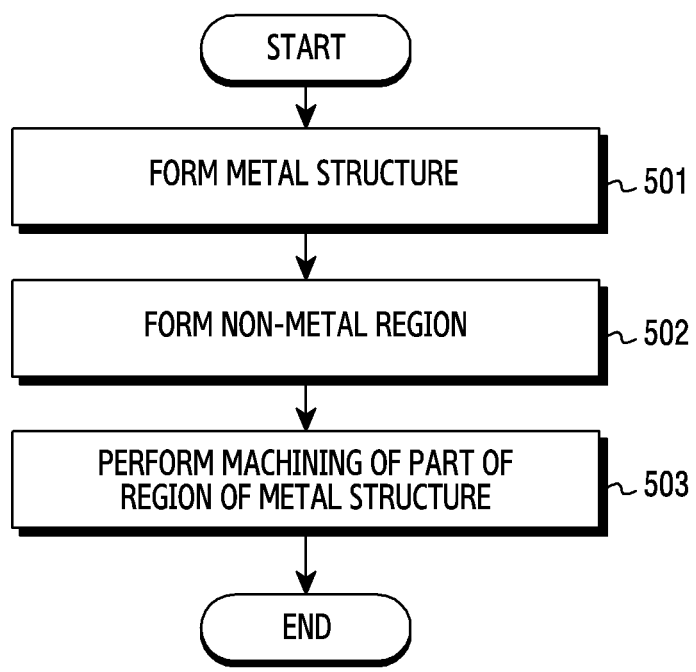
FIG. 5 is a flowchart illustrating an operation of generating an island metal structure according to an embodiment of the disclosure.

FIG. 5 is a flowchart illustrating an operation of generating an island metal structure according to an embodiment of the disclosure.

Figure 6A:
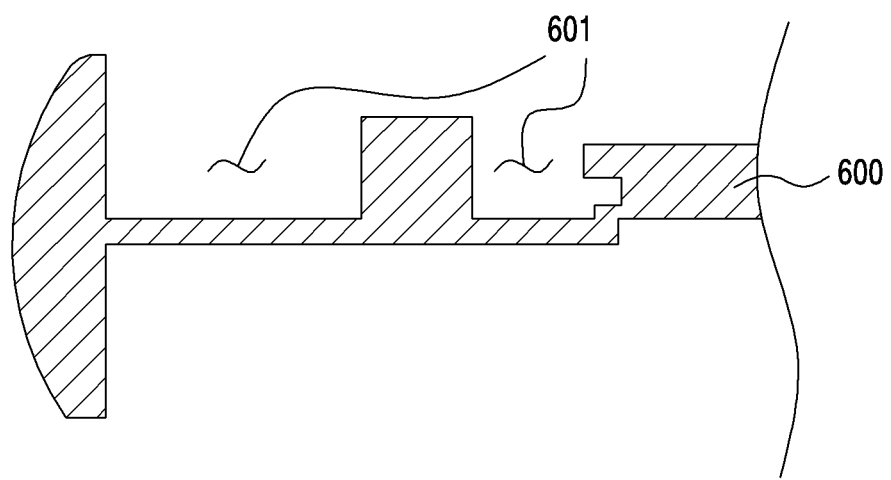
FIG. 6A illustrates a metal structure.
Figure 6B:
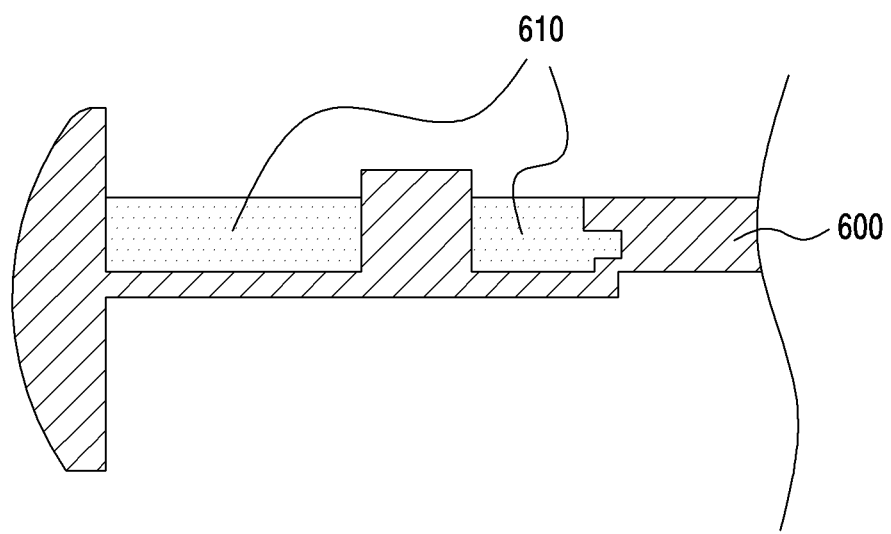
FIG. 6B illustrates a process of injecting a non-metal region into a bracket of FIG. 6A.
Figure 6C:
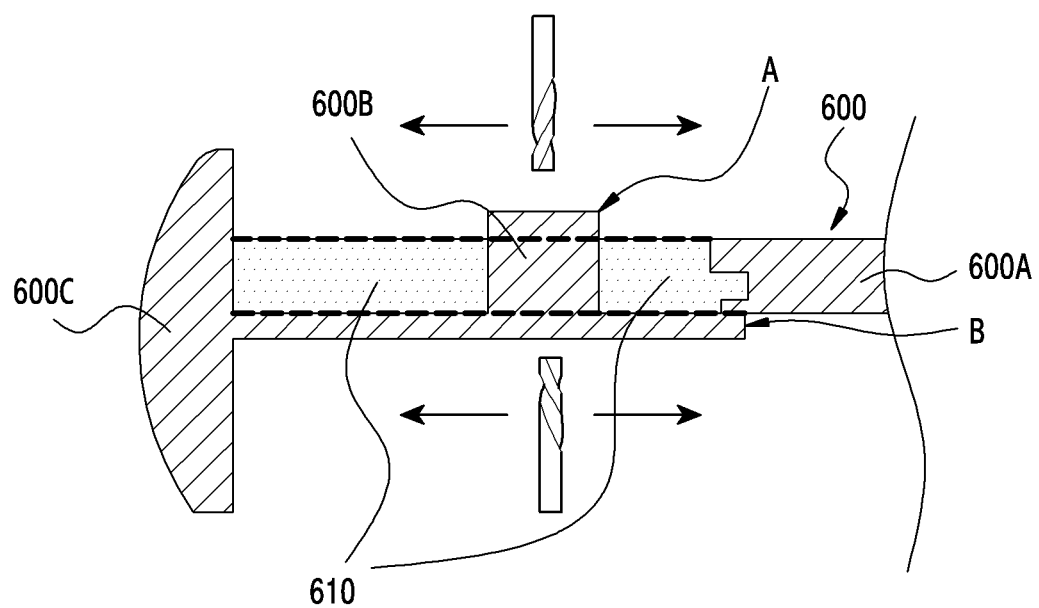
FIG. 6C illustrates a process of machining a part of a region of a bracket of FIG. 6B.
Figure 6D:
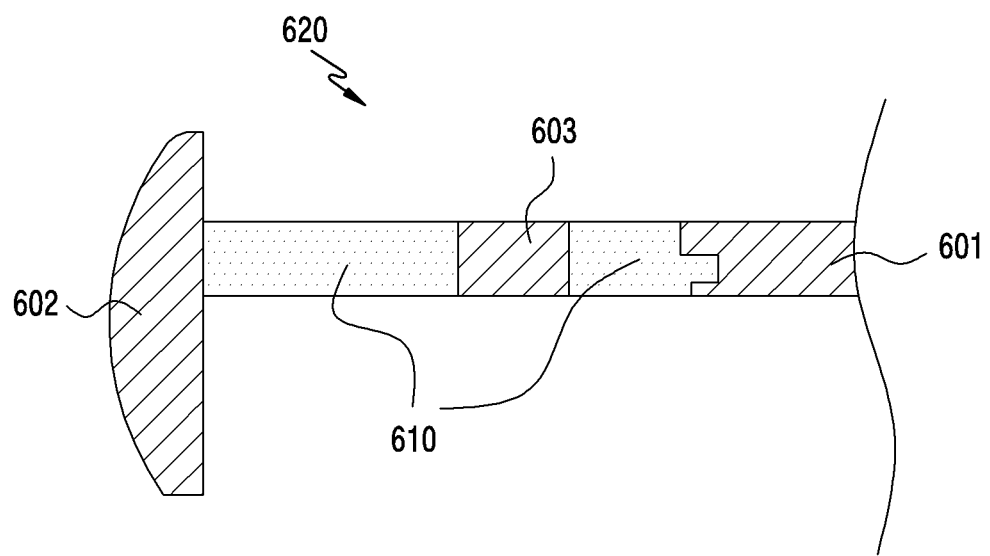
FIG. 6D illustrates a bracket having an island metal structure according to various embodiments of the disclosure.

FIGS. 6A to 6D are sectional views illustrating an operation of generating an island metal structure according to various embodiments of the disclosure. In this case, FIG. 6A illustrates a metal structure 600 for forming a bracket (e.g., the bracket 200a of FIG. 4) including a first structure (e.g., the first structure 210 of FIG. 4) and a second structure (e.g., the second structure 250 of FIG. 4), FIG. 6B illustrates a process of injecting a non-metal region 610 (e.g., the non-metal region 252 of FIG. 4) into the metal structure 600 of FIG. 6A, FIG. 6C illustrates a process of machining a part of a region of the metal structure 600 of FIG. 6B, and FIG. 6D illustrates a bracket (e.g., the bracket 200a of FIG. 4) having an island metal structure.

Hereinafter, the operation of generating the island metal structure of FIG. 5 will be described with reference to FIGS. 6A to 6D.

Referring to FIGS. 5 and 6A, in operation 501, a metal structure 600 that is a base of a bracket (e.g., the bracket 200a of FIG. 3) including a first structure (e.g., the first structure of FIG. 3) and a second structure (e.g., the second structure 250 of FIG. 3) may be formed (or generated). For example, the metal structure 600 may be made of a metal material, such as aluminum, magnesium, or a steel use stainless (SUS), and a groove 601 may be formed on at least one region of the metal structure 600, wherein the groove 601 may be formed to surround a part of a region of the metal structure 600. According to an embodiment of the disclosure, the metal structure 600 having the groove 601 formed on the at least one region thereof may be formed through a casting or press process, but the forming method is not limited thereto.

Referring to FIGS. 5 and 6B, in operation 502, a non-metal region 610 may be formed on one region of the metal structure 600 formed in operation 501. The non-metal region 610 may be formed on the one region of the metal structure 600 by using the groove 601 formed on the metal structure 600. According to an embodiment of the disclosure, the non-metal region 610 may be formed by double-injecting or insert-injecting a polymer (e.g., a polycarbonate (PC)) into the groove 601 formed to surround a part of the region of the metal structure 600. According to another embodiment of the disclosure, the non-metal region 610 may be formed by mechanically combining a polymer structure with the groove 601.

Referring to FIGS. 5, 6C, and 6D, in operation 503, a bracket (e.g., the bracket 200a of FIG. 3) having an island metal structure may be generated by machining of a part of a region of the metal structure 600, in which the non-metal region 610 is formed. The metal structure 600 having gone through operation 502 may include a first region 600A, a second region 600B, and a third region 600C, wherein the first region 600A, the second region 600B, and the third region 600C may be connected to one another through a part of a region (e.g., region B of FIG. 6C) of the metal structure 600. According to an embodiment of the disclosure, in operation 503, a part of a region (e.g., region A or region B of FIG. 6C) of the metal structure 600 may be cut through computer numerical control (CNC) machining Through operation 503, a part of a region (region B) of the metal structure 600, which connects the first region 600A, the second region 600B, and the third region 600C, may be removed from the metal structure 600. Accordingly, as shown in FIG. 6D, a bracket 620 (e.g., the bracket 200a of FIG. 3) including a first metal region 602 (e.g., the first structure 210 of FIG. 3), a second metal region 601 (e.g., the second metal region 251 of FIG. 3), and a third metal region 603, which is surrounded by a non-metal region 610 (e.g., the non-metal region 252 of FIG. 3) and is spaced apart from the first metal region 602 and the second metal region 601, may be formed.

For example, through operations 501 to 503, an bracket 620 having an island metal structure may be formed from the same metal frame 600, wherein the bracket includes a third metal region 603 positioned to be spaced apart from the first metal region 602 and the second metal region 601.

Figure 7:
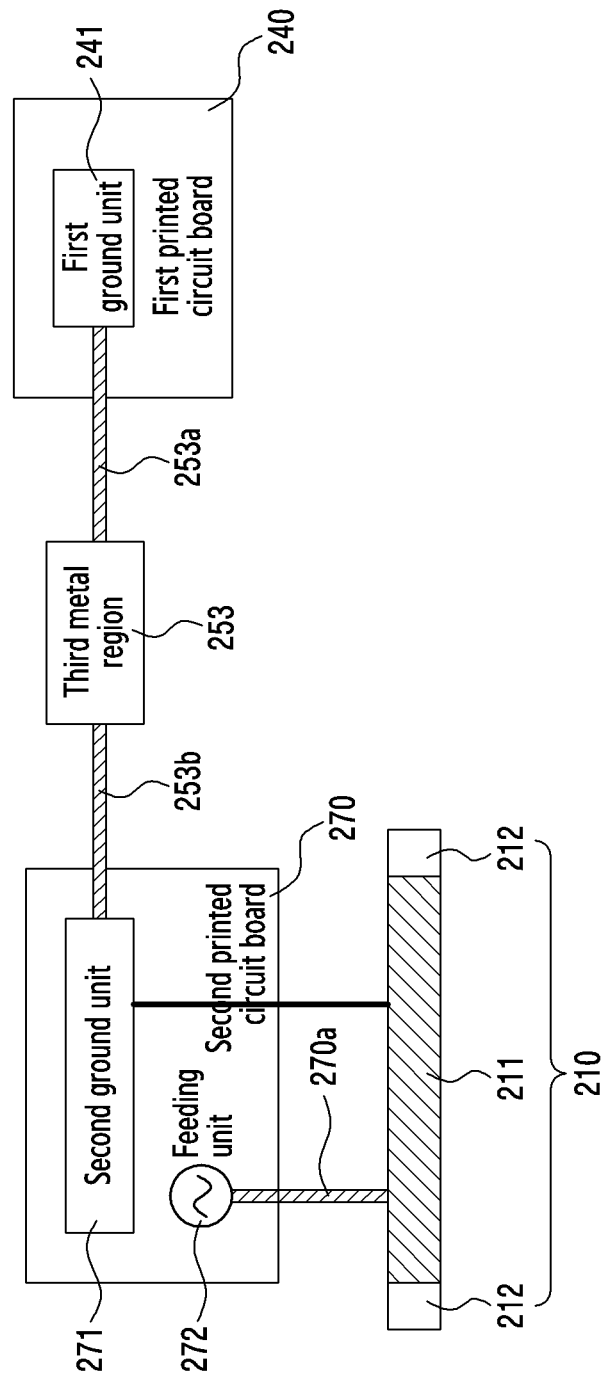
FIG. 7 illustrates electrical connection relationships among a first structure, a first printed circuit board, a second printed circuit board, and a third metal region of an electronic device according to an embodiment of the disclosure.

FIG. 7 illustrates electrical connection relationships among a first structure 210, a first printed circuit board 240, a second printed circuit board 270, and a third metal region 253 of an electronic device 200 according to an embodiment of the disclosure.

Figure 8:
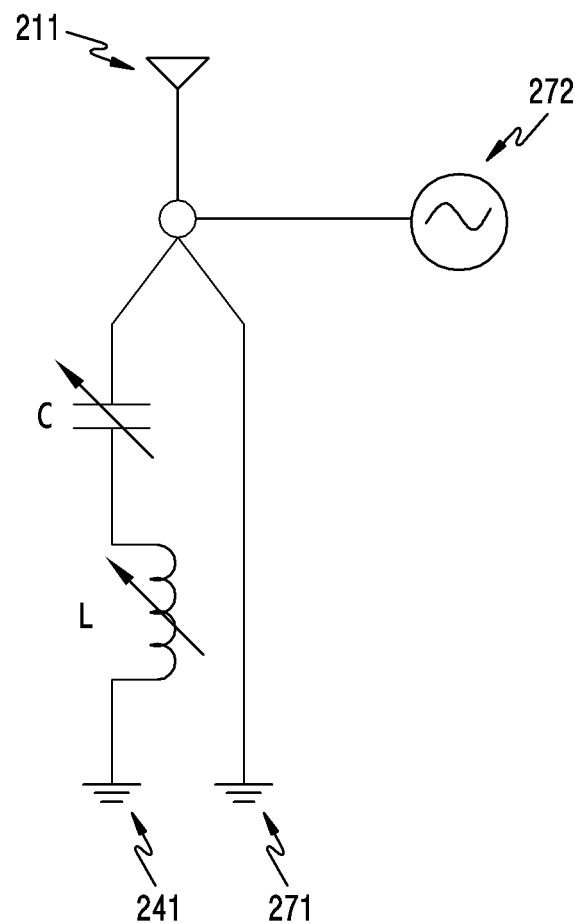
FIG. 8 is an equivalent circuit diagram illustrating an electrical path formed among a first metal region, a second ground unit, a third metal region, and a first ground unit of an electronic device according to an embodiment of the disclosure.

FIG. 8 is an equivalent circuit diagram illustrating an electrical path formed among a first metal region 211, a second ground unit 271, a third metal region 253, and a first ground unit 241 of an electronic device according to an embodiment of the disclosure.

Referring to FIGS. 7 and 8, an electronic device (e.g., the electronic device 200 of FIGS. 3 and 4) according to an embodiment of the disclosure may include a first structure 210 (e.g., the first structure 210 of FIGS. 3 and 4), a first printed circuit board 240 (e.g., the first printed circuit board 240 of FIGS. 3 and 4) including a first ground unit 241, a second printed circuit board 270 (e.g., the second printed circuit board 270 of FIGS. 3 and 4) including a second ground unit 271 and a feeding unit 272, and a third metal region 253 (e.g., the third metal region 253 of FIGS. 3 and 4). At least one of components of the electronic device of FIGS. 7 and 8 may be the same as or similar to at least one of the components of the electronic device 200 of FIGS. 3 and/or 4, and, hereinafter, the duplicated description will be omitted.

According to an embodiment of the disclosure, the first structure 210 may form a side surface of an electronic device, and may include a first metal region 211 and insulation regions 212. The first metal region 211 may operate as a radiator, and the insulation regions 212 may be positioned at both ends of the first metal region 211 and separate the first metal region 211 from other metal regions of the first structure 210. The first metal region 211 may be electrically connected to the feeding unit 272 of the second printed circuit board 270 through a first electrical connection unit 270a. The power may be fed to the first metal region 211 from the feeding unit 272 through the first electrical connection unit 270a, and the first metal region 211 may radiate a signal having a designated frequency to the outside of the electronic device. Further, the first metal region 211 may be electrically connected to the second ground unit 271 of the second printed circuit board 270, and the second ground unit 271 may function as a ground of a radiator (e.g., an antenna) formed of the first metal region 211.

According to an embodiment of the disclosure, the third metal region 253 may be electrically connected to the first ground unit 241 of the first printed circuit board 240 and the second ground unit 271 of the second printed circuit board 270. For example, the third metal region 253 may come into direct contact with the first ground unit 241, or may be electrically connected to the first ground unit 241 through a second electrical connection unit 253a. Further, the third metal region 253 may be electrically connected to the second ground unit 271 by coming into direct contact with the second ground unit 271, or through a third electrical connection unit 253b.

As the third metal region 253 is electrically connected to the first ground unit 241 of the first printed circuit board 240 and the second ground unit 271 of the second printed circuit board 270, an electrical path may be formed among the first metal region 211, the second ground unit 271, the third metal region 253, and the first ground unit 241. As the electrical path for connecting the first ground unit 241 and the first metal region 211 operating as an antenna radiator is formed, the first ground unit 241 may be configured to be a ground of the electrical path. Accordingly, a ground of a PIFA implemented through the first metal region 211, the feeding unit 272, and the second ground unit 271 may be extended to the first ground unit 241 which serves as a ground of a display panel (e.g., the display panel 230 of FIGS. 3 and 4).

Referring to FIG. 8, in the case of an island metal structure, that is, in the case of an electronic device not including the third metal region 253, an inductor L and a capacitor C may be formed between the first ground unit 241 serving as a ground of a display panel and the PIFA implemented through the first metal region 211, the feeding unit 272, and the second ground unit 271.

For example, as insulation tape (e.g., the insulation tape 254 of FIG. 4) is attached to one surface of a second structure (e.g., the second structure 250 of FIGS. 3 and 4) of a bracket (e.g., the bracket 200a of FIGS. 3 and 4) in order to insulate the first ground unit 241 from the second structure of the bracket, a capacitor C may be formed between the first ground unit 241 and the second ground unit 271.

For example, for electrical stability of electronic components in an electronic device, the first ground unit 241 and the second ground unit 271 may be connected through a flexible printed circuit board (FPCB). An electrical path between the first ground unit 241 and the second ground unit 271 when the first ground unit 241 and the second ground unit 271 are electrically connected through the flexible printed circuit board may become relatively longer than an electrical path between the first ground unit 241 and the second ground unit 271 formed across one region of the second structure (e.g., the second structure 250 of FIGS. 3 and 4) of a bracket (e.g., the bracket 200a of FIGS. 3 and 4). An inductor L may be formed between the first ground unit 241 and the second ground unit 271 by the above-described electrical path between the first ground unit 241 and the second ground unit 271.

The parasitic resonance causing an antenna performance of the PIFA to deteriorate may be generated by a parasitic element (e.g., parasitic capacitance C and parasitic reactance L) that is unnecessarily formed between the first ground unit 241 and the second ground unit 271.

According to an embodiment of the disclosure, the electronic device may form an electrical path among the first metal region 211, the second ground unit 271, the third metal region 253, and the first ground unit 241, thereby extending a ground of the PIFA to the first ground unit 241. For example, according to an embodiment of the disclosure, the electronic device may electrically connect the first ground unit 241 and the second ground unit 271, without using the flexible printed circuit board. Accordingly, the parasitic element that is unnecessarily formed between the first ground unit 241 and the second ground unit 271 may be removed, thereby preventing the deterioration of the antenna performance caused by the parasitic resonance.

Although not shown in the drawing, according to another embodiment of the disclosure, the electronic device may form an electrical path between a conductive pattern formed on one region of the bracket and the first ground unit 241 serving as a ground of the display panel, through the third metal region 253 of an island metal structure, thereby restricting the parasitic resonance that is generated in a laser direct structing (LDS) antenna by the ground of the display panel. According to another embodiment of the disclosure, the electronic device may form an electrical path between the first ground unit 241 and a conductor formed on one region of a cover (e.g., the rear plate 290 of FIGS. 3 and 4), or multiple antennas arranged on the flexible circuit board, through the third metal region 253, thereby restricting the parasitic resonance that is generated in an FPCB-type antenna or an in-mold antenna (IMA).

Figure 9:
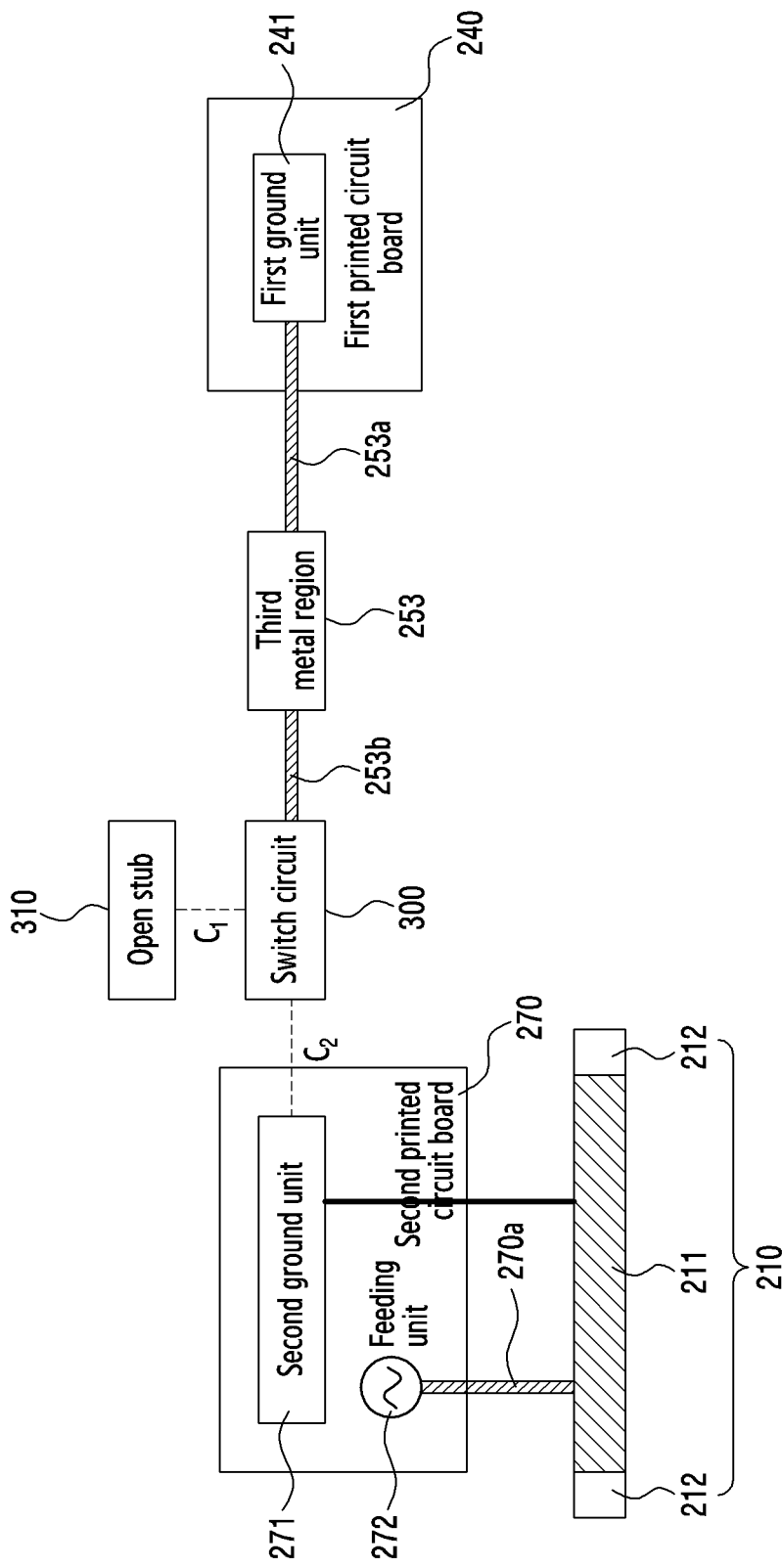
FIG. 9 illustrates electrical connection relationships among a first structure, a first printed circuit board, a second printed circuit board, a third metal region, and a switch circuit of an electronic device according to an embodiment of the disclosure.

FIG. 9 illustrates electrical connection relationships among a first structure, a first printed circuit board, a second printed circuit board, a third metal region, and a switch circuit of an electronic device according to an embodiment of the disclosure. In FIG. 9, dotted line $C_1$ between a switch circuit 300 and an open stub 310 and dotted line $C_2$ between the switch circuit 300 and a second ground unit 271 indicate that the switch circuit 300 may be selectively connected to the second ground unit 271 or the open stub 310.

Referring to FIG. 9, an electronic device (e.g., the electronic device 200 of FIGS. 3 and 4) according to an embodiment of the disclosure may include a first structure 210 (e.g., the first structure 210 of FIG. 7), a first printed circuit board 240 (e.g., the first printed circuit board 240 of FIG. 7) including a first ground unit 241 (e.g., the first ground unit 241 of FIG. 7), a second printed circuit board 270 (e.g., the second printed circuit board 270 of FIG. 7) including a second ground unit (e.g., the second ground unit 271 of FIG. 7) and a feeding unit (e.g., the feeding unit 272 of FIG. 7), a third metal region 253 (e.g., the third metal region 253 of FIG. 7), a switch circuit 300, and an open stub 310. The electronic device of FIG. 9 may further include the switch circuit 300 and the open stub 310 to the electronic device of FIG. 7, and, hereinafter, the duplicated description will be omitted.

According to an embodiment of the disclosure, the switch circuit 300 may be electrically connected to a third electrical connection unit 253b. Further, the switch circuit 300 may be electrically connected (e.g., $C_1$ of FIG. 9) to the second ground unit 271, and may be electrically connected (e.g., $C_2$ of FIG. 9) to the open stub 310. For example, as a connection state of the switch circuit 300 changes, the third electrical connection unit 253b may be connected to the second ground unit 271, or may be electrically connected to the open stub 310.

In one example, when the third electrical connection unit 253b is electrically connected to the second ground unit 271, the third metal region 253 connected to the third electrical connection unit 253b may be also electrically connected to the second ground unit 271. Similarly, when the third electrical connection unit 253b is electrically connected to the open stub 310, the third metal region 253 connected to the third electrical connection unit 253b may be electrically connected to the open stub 310.

For example, depending on the connection state of the switch circuit 300, the third metal region 253 electrically connected to the first ground unit 241 through the second electrical connection unit 253a may be electrically connected to the second ground unit 271, or may be electrically connected to the open stub 310.

In one example, according to on the connection state of the switch circuit 300, when the third electrical connection unit 253b is electrically connected to the second ground unit 271, the third metal region 253 that is connected to or in contact with the third electrical connection unit 253b may become electrically grounded. On the other hand, according to on the connection state of the switch circuit 300, when the third electrical connection unit 253b is electrically connected to the open stub 310, the third metal region 253 that is connected to or in contact with the third electrical connection unit 253b may become electrically open. Due to the above-described connection state of the switch circuit 300, a resonance point or an electro-magnetic interference (EMI) path of a PIFA implemented by the first metal region 211, the feeding unit 272, and the second ground unit 271 may change, and, accordingly, the performance of the antenna may change depending on the connection state of the switch circuit.

According to an embodiment of the disclosure, the switch circuit 300 may be electrically connected to a processor (e.g., the processor 120 of FIG. 1) positioned on the second printed circuit board 270, and the processor may change a connection state of the switch circuit 300 according to a frequency band of an RF signal fed to the first metal region 211. However, the detailed description relating to a process of controlling a connection state of the switch circuit 300 by the processor will be made later.

Figure 10:
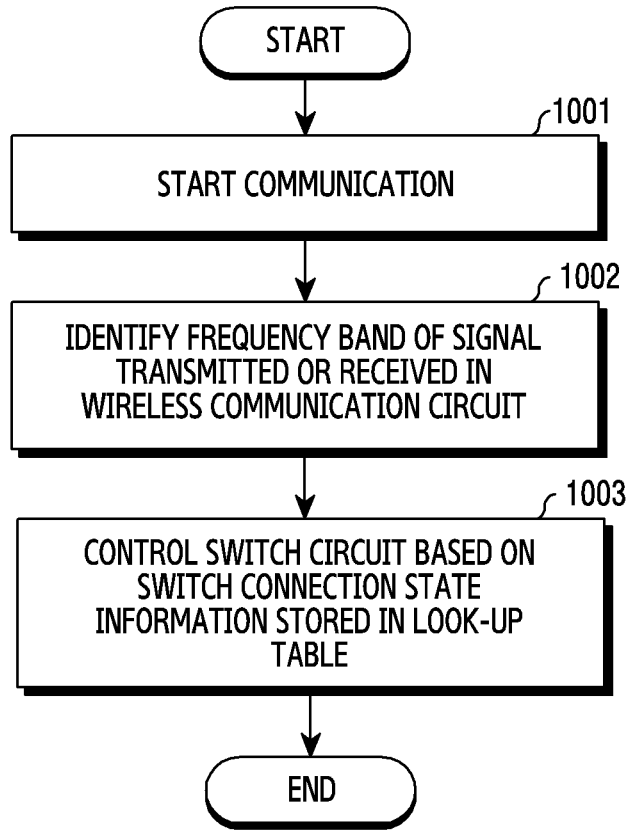
FIG. 10 is a flowchart illustrating a process of controlling a switch circuit of an electronic device according to an embodiment of the disclosure.

FIG. 10 is a flowchart illustrating a process of controlling a switch circuit of an electronic device according to an embodiment of the disclosure.

Figure 11:
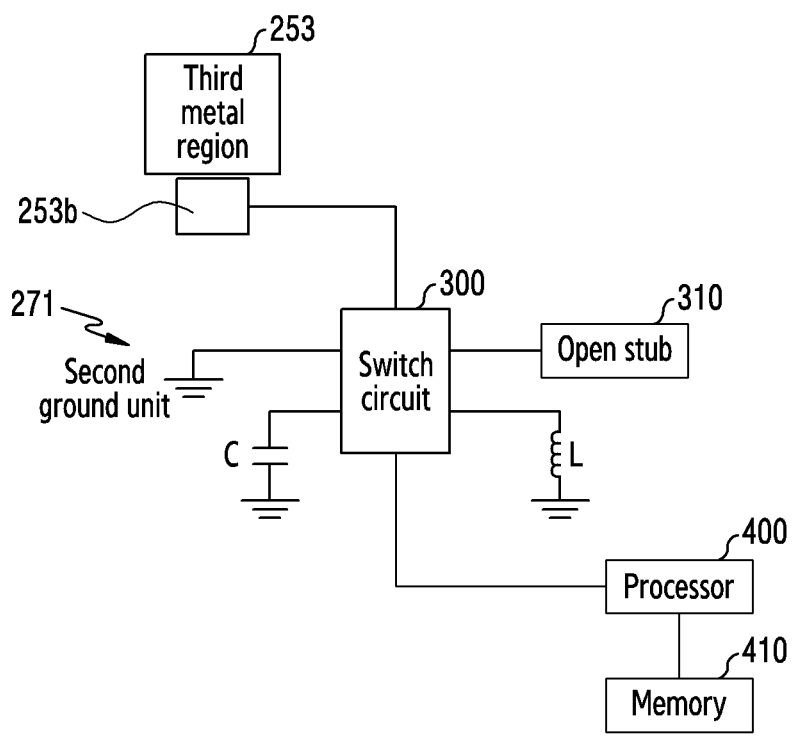
FIG. 11 illustrates a memory and a processor electrically connected to a switch circuit of an electronic device according to an embodiment of the disclosure.

FIG. 11 illustrates a memory and a processor electrically connected to a switch circuit of an electronic device according to an embodiment of the disclosure.

Hereinafter, the process of controlling the switch circuit of FIG. 10 will be described with reference to components illustrated in FIG. 11.

Referring to FIGS. 10 and 11, an electronic device (e.g., the electronic device 200 of FIGS. 3 and 4) according to an embodiment of the disclosure may include a third metal region 253 (e.g., the third metal region 253 of FIG. 9), a third electrical connection unit 253b (e.g., the third electrical connection unit 253b of FIG. 9), a switch circuit 300 (e.g., the switch circuit 300 of FIG. 9), an open stub 310 (e.g., the open stub 310 of FIG. 9), a second ground unit 271 (e.g., the second ground unit 271 of FIG. 9), an inductor L, a capacitor C, a processor 400, and a memory 410.

According to an embodiment of the disclosure, the switch circuit 300 may enable the third electrical connection unit 253b to be selectively connected to the second ground unit 271 (e.g., the second ground unit 271 of FIG. 9) or the open stub 310 (e.g., the open stub 310 of FIG. 9). As the third electrical connection unit 253b is connected to the second ground unit 271 or the open stub 310, the third metal region 253 which comes into contact with the third electrical connection unit 253b may be also electrically connected to the second ground unit 271, or may be also electrically connected to the open stub 310. According to another embodiment of the disclosure, the switch circuit 300 may enable the third electrical connection unit 253b to be electrically connected to an inductor L or a capacitor C other than the second ground unit 271 and the open stub 310. In the above-described case, the third metal region 253 which comes into contact with the third electrical connection unit 253b may be electrically connected to the inductor L, or may be electrically connected to the capacitor C.

According to an embodiment of the disclosure, the switch circuit 300 may be electrically connected to the processor 400, wherein the processor 400 may be transmitted to an antenna radiator (e.g., the first metal region 211 of FIG. 9) in a wireless communication circuit, or may control a connection state of the switch circuit 300 according to a frequency band of an RF signal received from the antenna radiator.

According to an embodiment of the disclosure, in operation 1001, as the power of an electronic device (e.g., the electronic device 200 of FIGS. 3 and 4) is activated (e.g., the electronic device is turned on), the electronic device may start wireless communication. When the power of the electronic device is activated, a processor 400 according to an embodiment of the disclosure may enable an RF signal to be fed to an antenna radiator (e.g., the first metal region 211 of FIG. 9) for wireless communication.

In the process of feeding of the RF signal to the antenna radiator, as described above, the parasitic resonance may be generated by a first ground unit (e.g., the first ground unit 241 of FIG. 9) serving as a ground of a display panel (e.g., the display panel 230 of FIG. 3).

However, since the parasitic resonance generated by the first ground unit in the process of feeding of the RF signal may change according to the characteristics (e.g., a frequency band) of the RF signal, the processor 400 according to an embodiment of the disclosure may identify a frequency band of the RF signal transmitted or received in a wireless communication circuit (e.g., the communication module 190 of FIG. 1), in operation 1002.

According to an embodiment of the disclosure, in operation 1003, the processor 400 may control the switch circuit 300 based on a look-up table stored in the memory 410 to change a connection state of the switch circuit 300. According to an embodiment of the disclosure, the memory 410 may include the look-up table in which information on the optimal connection state of the switch circuit 300 according to the frequency band of the RF signal is stored. The processor 400 may match the frequency band of the RF signal, identified in operation 1002 as described above and the information on the optimal connection state of the switch circuit 300 according to the frequency band of the RF signal, stored in the look-up table, and may change the connection state of the switch circuit 300 based on the result of the matching.

For example, when the RF signal transmitted or received in the wireless communication circuit is in a first frequency band, the processor 400 may control the switch circuit 300 to enable the third electrical connection unit 253b to be connected to the second ground unit 271. Accordingly, the third metal region 253 which is in contract with the third electrical connection unit 253b may be electrically connected to the second ground unit 271 and may be grounded. In another example, when the RF signal transmitted or received in the wireless communication circuit is in a second frequency band, the processor 400 may enable the third electrical connection unit 253b to be connected to the open stub 310 so that the third metal region 253 becomes electrically open. In another example, when the RF signal transmitted or received in the wireless communication circuit is in a third frequency band, the processor 400 may enable the third electrical connection unit 253*b* to be connected to the inductor L or the capacitor C to also change a resonance point of an antenna radiator.

Relating to the frequency band of the RF signal, when the performance of an antenna in the first frequency band (e.g., a band of about 1 GHz or less) is enhanced, the performance of an antenna in the second frequency band (e.g., a frequency band of about 1 GHz or higher) may deteriorate. According to an embodiment of the disclosure, the processor 400 of the electronic device may change a connection state of the switch circuit 300 according to the frequency band of the RF signal as described in operations 1001 to 1003, thereby enhancing both the performance of the antenna in the first frequency band (e.g., a frequency band of about 1 GHz or less) and the performance of the antenna in the second frequency band (e.g., a frequency band of about 1 GHz or higher).

Figure 12:
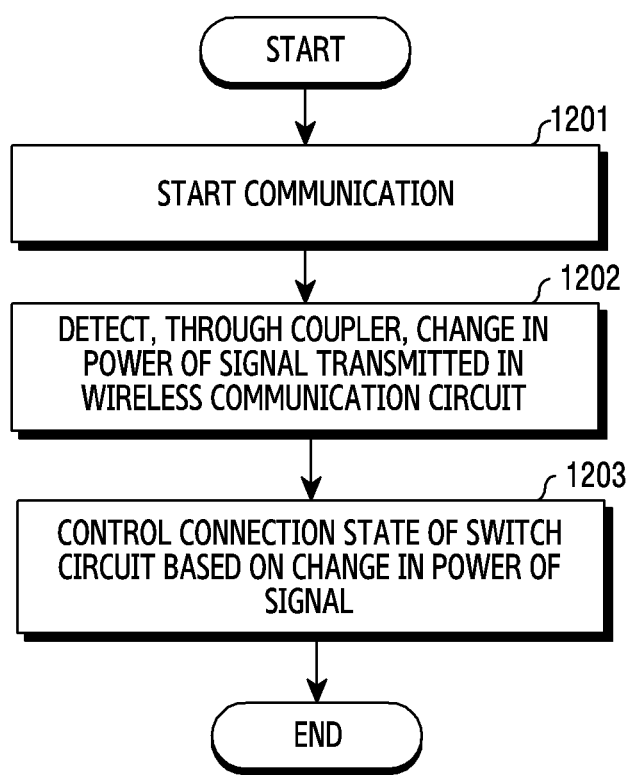
FIG. 12 is a flowchart illustrating a process of controlling a switch circuit of an electronic device according to an embodiment of the disclosure.

FIG. 12 is a flowchart illustrating a process of controlling a switch circuit of an electronic device according to an embodiment of the disclosure.

Figure 13:
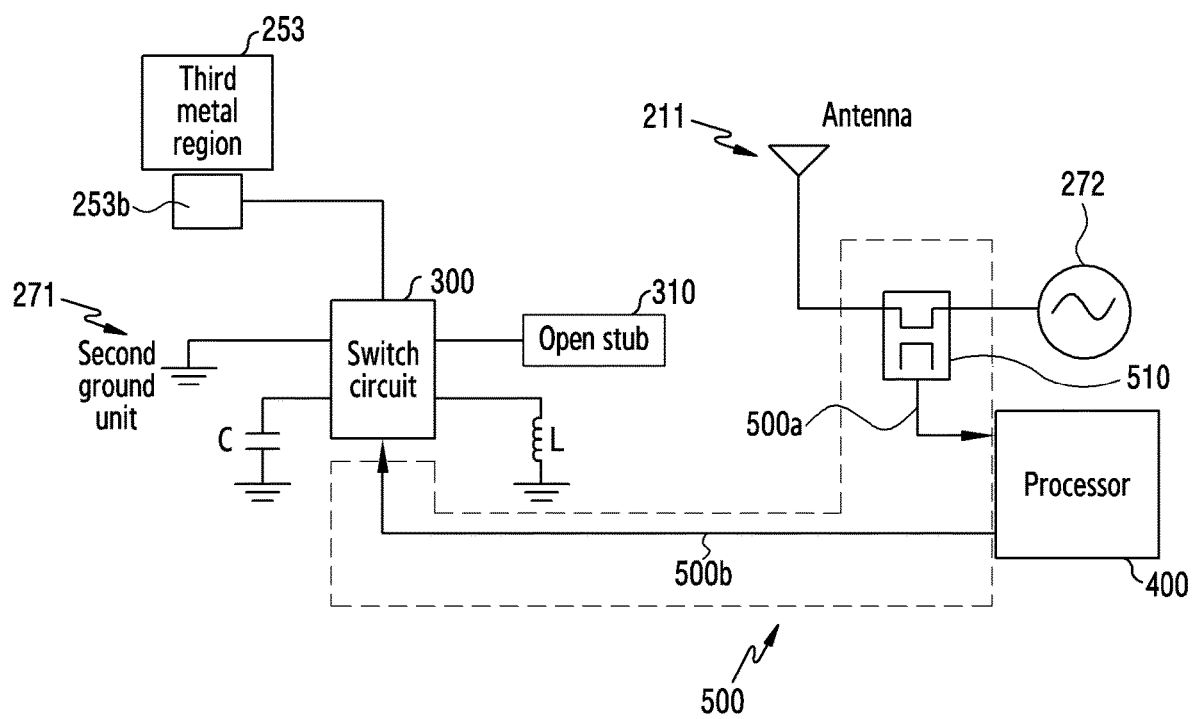
FIG. 13 illustrates a tuner integrated circuit (IC) of an electronic device according to an embodiment of the disclosure.

FIG. 13 illustrates a tuner integrated circuit (IC) of an electronic device according to an embodiment of the disclosure.

Hereinafter, the process of controlling the switch circuit of FIG. 12 will be described with reference to components illustrated in FIG. 13.

Referring to FIGS. 12 and 13, an electronic device (e.g., the electronic device 200 of FIGS. 3 and 4) according to another embodiment may include a third metal region 253 (e.g., the third metal region 253 of FIGS. 9 and 11), a third electrical connection unit 253*b* (e.g., the third electrical connection unit 253*b* of FIGS. 9 and 11), a switch circuit 300 (e.g., the switch circuit 300 of FIGS. 9 and 11), an open stub 310 (e.g., the open stub 310 of FIGS. 9 and 11), a capacitor C (e.g., the capacitor C of FIG. 9), an inductor L (e.g., the inductor L of FIG. 9), a first metal region (or an antenna) 211 (e.g., the first metal region 211 of FIG. 9), a feeding unit 272 (e.g., the feeding unit 272 of FIG. 9), a processor 400 (e.g., the processor 400 of FIG. 11), and/or a tuner integrated circuit (IC) 500.

According to an embodiment of the disclosure, the tuner IC 500 may include a first electrical path 500*a* for electrically connecting the processor 400 and a coupler 510 for detecting power of an RF signal fed to the first metal region 211 and a second electrical path 500*b* for electrically connecting the processor 400 and the switch circuit 300.

In one example, the switch circuit 300 may enable the third electrical connection unit 253*b* to be selectively connected to a second ground unit 271 (e.g., the second ground unit 271 of FIG. 9), an open stub 310 (e.g., the open stub 310 of FIG. 9), the inductor L, or the capacitor C.

In one example, the switch circuit 300 may be electrically connected to the processor 400, wherein the processor 400 may control a connection state of the switch circuit 300 based on output of the RF signal fed to the first metal region 211 (e.g., the first metal region 211 of FIG. 9) operating as an antenna radiator.

According to an embodiment of the disclosure, in operation 1201, as the power of an electronic device (e.g., the electronic device 200 of FIGS. 3 and 4) is activated (e.g., the electronic device is turned on), the electronic device may start wireless communication. When the power of the electronic device is activated, a processor 400 according to an embodiment of the disclosure may enable an RF signal to be fed to an antenna radiator (e.g., the first metal region 211 of FIG. 9) for wireless communication.

In the process of feeding of the RF signal to the antenna radiator, as described above, the parasitic resonance may be generated by a first ground unit (e.g., the first ground unit 241 of FIG. 9) serving as a ground of a display panel (e.g., the display panel 230 of FIG. 3).

However, since the parasitic resonance generated by the first ground unit in the process of feeding of the RF signal may change according to the characteristics (e.g., a frequency band) of the RF signal, the processor 400 according to an embodiment of the disclosure may detect, through the coupler 510, a change in power of a signal (e.g., the RF signal fed to the first metal region 211) transmitted in the wireless communication circuit, in operation 1202. In one example, the processor 400 may detect a change in power of the RF signal fed to the first metal region 211 through the first electrical path 500*a*.

According to an embodiment of the disclosure, in operation 1203, the processor 400 may control a connection state of the switch circuit 300 based on the change in power of the RF signal, detected in operation 1202 as described above. The processor 400 may determine a change in impedance of the RF signal based on the change in power of the RF signal, detected in operation 1202. In response to the change in the impedance of the RF signal, the processor 400 may control a connection state of the switch circuit 300 through a second electrical path 500*b*. For example, according to the change in the impedance of the RF signal, the processor 400 may compare the RF signal fed to the first metal region 211 and a resonance point of the first metal region 211 so as to determine a difference between the RF signal fed to the first metal region 211 and the resonance point of the first metal region 211. Based on the difference between the RF signal fed to the first metal region 211 and the resonance point of the first metal region 211, the processor 400 may change a connection state of the switch circuit 300 so as to connect the third electrical connection unit 253*b* to the second ground unit 271, the open stub 310, the inductor L, or the capacitor C. As the third electrical connection unit 253*b* is selectively connected to the second ground unit 271, the open stub 310, the inductor L, or the capacitor C by the change in the connection state of the switch circuit 300, the third metal region 253 which is in contact with the third electrical connection unit 253*b* may be electrically connected to the second ground unit 271, the open stub 310, the inductor L, or the capacitor C. However, the detailed description thereof is the same as or similar to the one described above, and thus, hereinafter, the duplicated description will be omitted.

For example, unlike the electronic device of FIG. 11 described above, an electronic device according to an embodiment of the disclosure may form a closed loop circuit between the switch circuit 300 and the PIFA through the tuner IC 500. Accordingly, through operations 1201 to 1203, the electronic device according to an embodiment of the disclosure may control the connection state of the switch circuit 300 in real time based on the change in output of the RF signal fed to the first metal region 211, without the look-up table stored in a memory (e.g., the memory 410 of FIG. 11).

Figure 14A:
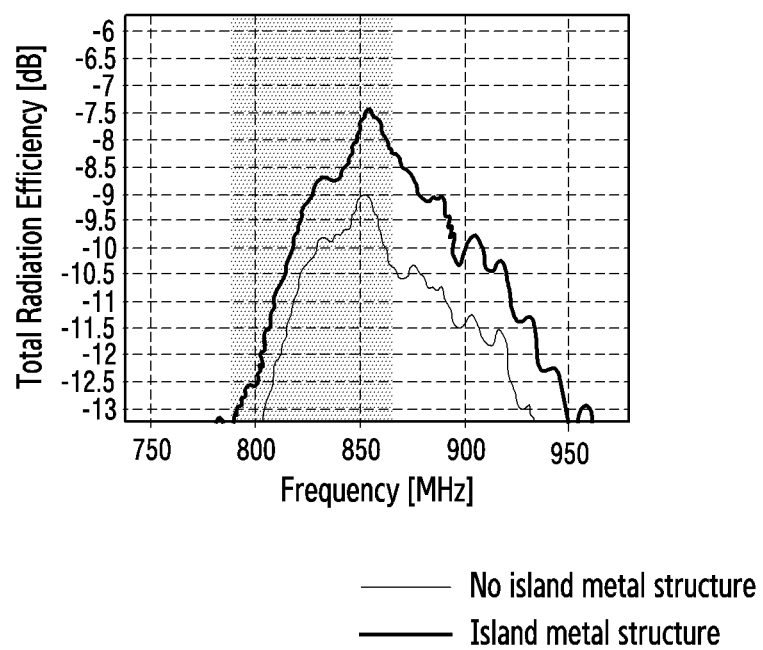
FIG. 14A is a graph in which antenna gains are compared according to whether there is an island metal structure according to an embodiment of the disclosure.
Figure 14B:
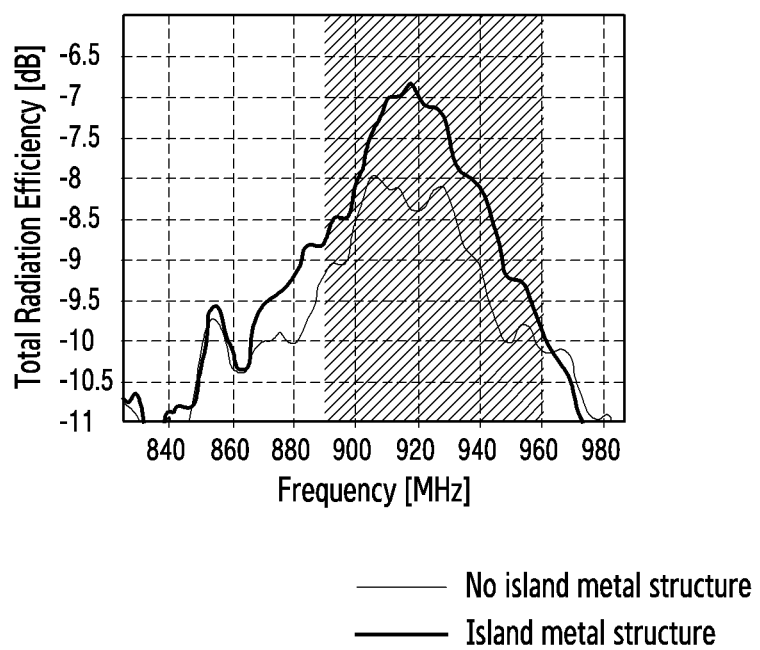
FIG. 14B is a graph in which antenna gains are compared according to whether there is an island metal structure according to an embodiment of the disclosure.

FIGS. 14A and 14B are graphs in which antenna gains are compared according to whether there is an island metal structure according to various embodiments of the disclosure.

As described above, an electronic device according to an embodiment of the disclosure may include an bracket having an island metal structure, in which one metal region (e.g., the third metal region 253 of FIG. 3) of a bracket (e.g., the bracket 200*a* of FIG. 3) is positioned to be surrounded by a non-metal region (e.g., the non-metal region 252 of FIG. 3) and can be separated from other metal regions (e.g., the first metal region 211 and the second metal region 251 of FIG. 3) of the bracket. The above-described one metal region of the bracket may be electrically connected to a ground (e.g., the second ground unit 271 of FIG. 7) of an antenna and a ground (e.g., the first ground unit 241 of FIG. 7) of a display panel, and, accordingly, an electronic path for connecting the ground of the antenna and the ground of the display panel may be generated. The electronic device according to an embodiment of the disclosure may extend the ground of the antenna to the ground of the display panel through the above-described electrical path. As the ground of the antenna is extended to the ground of the display panel, the parasitic resonance that may be generated by the ground of the display panel during operation of the display panel can be reduced, whereby a radiation performance of the antenna can be enhanced.

Referring to FIGS. 14A and 14B, it is identified that an antenna gain increases by 1 to 2 dB in a 800 MHz band and a 900 MHz band (e.g., hatched regions of FIGS. 14A and 14B) when an electronic device has an island metal structure in which a ground of an antenna can be extended to a ground of a display panel, compared to an electronic device not having an island metal structure.

An electronic device according to an embodiment of the disclosure may include a switch circuit (e.g., the switch circuit 300 of FIGS. 9 and 13) and may change a connection state of the switch circuit according to a frequency band of an RF signal transmitted or received in a wireless communication circuit. For example, the electronic device may enable the above-described one metal region (e.g., the third metal region 253 of FIG. 3) of the bracket to be selectively connected to a ground (e.g., the second ground unit 271 of FIG. 11) of an antenna, an open stub (e.g., the open stub 310 of FIG. 11), an inductor (e.g., L of FIG. 11), or a capacitor (e.g., C of FIG. 11).

Generally, when the performance of an antenna in a first frequency band (e.g., a band of about 1 GHz or less) is enhanced, the performance of an antenna in a second frequency band (e.g., a band of about 1 GHz or higher) deteriorates. However, the electronic device according to an embodiment of the disclosure may change the connection state of the switch circuit according to the frequency band of the RF signal, thereby enhancing both the performance of the antenna in the first frequency band (e.g., a band of about 1 GHz or less) and the performance of the antenna in the second frequency band (e.g., a band of about 1 GHz or higher).

TABLE 1

| | First electronic device | | | Second electronic device | | | Third electronic device | | | Fourth electronic device | | |
|---|---|---|---|---|---|---|---|---|---|---|---|---|
| #1 | 16.43 | 16.44 | 16.19 | 16.44 | 16.23 | 16.77 | 15.71 | 15.80 | 14.23 | 26.12 | 26.44 | 25.93 |
| #2 | 17.32 | 17.47 | 17.33 | 17.98 | 18.10 | 18.21 | 15.88 | 16.26 | 15.44 | 27.77 | 27.59 | 27.19 |
| Improvement degree | 0.89 | 1.03 | 1.14 | 1.54 | 1.87 | 1.44 | 0.17 | 0.46 | 1.21 | 1.65 | 1.15 | 1.26 |

Table 1 shows a comparison between a total radiated power (TRP) value (dBm) of an electronic device (e.g., #1 of Table 1) not having an island metal structure and that of an electronic device (e.g., #2 of Table 1) having an island metal structure. In the disclosure, the TRP value means a value indicating radiating power transmitted (or sent out) from an antenna to a base station, wherein the larger the TRP value is, the better the radiation performance of an antenna is. In the disclosure, a first electronic device, a second electronic device, a third electronic device, and a fourth electronic device may mean electronic devices different from one another, and the first electronic device, the second electronic device, the third electronic device, and the fourth electronic device may have different structures from one another.

Referring to Table 1, as a result of comparing multiple electronic devices (e.g., the first to fourth electronic devices) to see how TRP values change according to whether there is an island metal structure, it is identified that an electronic device having an island metal structure has a relatively higher TRP value. Further, among different types of electronic devices (e.g., the first to fourth electronic devices), an electronic device to which an island metal structure is applied has an increased TRP value, compared to an electronic device to which no island metal structure is applied.

Referring to FIGS. 14A and 14B and Table 1, it is identified that an island metal structure is applied to an electronic device according to an embodiment of the disclosure, whereby a radiation performance of an antenna can be enhanced, compared to an electronic device not having an island metal structure.

TABLE 2

| | First frequency band | Second frequency band | Third frequency band |
|---|---|---|---|
| First connection state | −95.5 | −96.0 | −95.1 |
| Second connection state | −96.6 | −96.9 | −94.2 |

Table 2 shows a comparison among different frequency bands (e.g., a first frequency band, a second frequency band, and a third frequency band) of a change in a total isotropic sensitivity (TIS) value (dBm) according to a connection state of a switch circuit (e.g., the switch circuit 300 of FIGS. 9 and 13). In the disclosure, the TIS value means receiving sensitivity of radiation power received in an antenna of an electronic device from a base station, wherein the smaller the TIS value is, the better the radiation performance of an antenna is. A first connection state shown in Table 2 means that one metal region (e.g., the third metal region 253 of FIGS. 3, 9, and 13) of a bracket (e.g., the bracket 300a of FIG. 3) is connected to an antenna ground (e.g., the second ground unit 271 of FIGS. 9 and 13), and a second connection state means that one metal region (e.g., the third metal region 253 of FIGS. 3, 9, and 13) of a bracket is connected to an open stub (e.g., the open stub 310 of FIGS. 9 and 13).

Referring to Table 2, in the first frequency band and the second frequency band, the electronic device may have a relatively lower TIS value in the case in which the one metal region (e.g., the third metal region 253 of FIGS. 3, 9, and 13) of the bracket is connected to the antenna ground (e.g., the second ground unit 271 of FIGS. 9 and 13), compared to the case in which the one metal region (e.g., the third metal region 253 of FIGS. 3, 9, and 13) of the bracket is connected to the open stub (e.g., the open stub 310 of FIGS. 9 and 13).

On the other hand, in the third frequency band, the electronic device may have a relatively lower TIS value in the case in which the one metal region (e.g., the third metal region 253 of FIGS. 3, 9, and 13) of the bracket is connected to the open stub (e.g., the open stub 310 of FIGS. 9 and 13), compared to the case in which the one metal region (e.g., the third metal region 253 of FIGS. 3, 9, and 13) of the bracket is connected to the antenna ground (e.g., the second ground unit 271 of FIGS. 9 and 13).

According to an embodiment of the disclosure, the electronic device may control the connection state of the switch circuit (e.g., the switch circuit 300 of FIGS. 9 and 13) when the frequency band of the RF signal is the first frequency band or the second frequency band, so as to connect the one metal region (e.g., the third metal region 253 of FIGS. 3, 9, and 13) of the bracket to the antenna ground (e.g., the second ground unit 271 of FIGS. 9 and 13). On the other hand, according to an embodiment of the disclosure, the electronic device may control the connection state of the switch circuit (e.g., the switch circuit 300 of FIGS. 9 and 13) when the frequency band of the RF signal is the third frequency band, so as to connect the one metal region (e.g., the third metal region 253 of FIGS. 3, 9, and 13) of the bracket to the open stub (e.g., the open stub 310 of FIGS. 9 and 13).

In other words, according to an embodiment of the disclosure, the electronic device may change the connection state of the switch according to the frequency band of the RF signal, thereby enhancing the performance of the antenna, regardless of the frequency band of the RF signal.

According to an embodiment of the disclosure, an electronic device (e.g., the electronic device 200 of FIGS. 2A, 2B, and/or 3) may include a display panel (e.g., the display panel 230 of FIG. 2A) including a first surface facing a first direction (e.g., 1 of FIG. 2A) and a second surface facing a second direction (e.g., 2 of FIG. 2A), a first printed circuit board (e.g., the first printed circuit board 240 of FIG. 4) configured to be positioned in the second direction of the display panel and to include a first ground unit (e.g., the first ground unit 241 of FIG. 7), a bracket (e.g., the bracket 200a of FIG. 3) including a first structure (e.g., the first structure 210 of FIG. 3) which forms a side surface of the electronic device and a second structure (e.g., the second structure 250 of FIG. 3) which forms a space in which electronic components are mounted, wherein the first structure of the bracket includes a first metal region (e.g., the first metal region 211 of FIG. 3) operating as a radiator and insulation regions (e.g., the insulation regions 212 of FIG. 3) positioned at both ends of the first metal region, and the second structure of the bracket includes a second metal region (e.g., the second metal region 251 of FIG. 3), a first non-metal region (e.g., the non-metal region 252 of FIG. 3), and a third metal region (e.g., the third metal region 253 of FIG. 3) extending through one region (e.g., region A of FIGS. 3 and 4) of the first non-metal region, a wireless communication circuit (e.g., the communication module 190 of FIG. 1) which is electrically connected to the first metal region and is configured to transmit or receive at least one signal having a designated frequency, and a second printed circuit board (e.g., the second printed circuit board 270 of FIG. 4) including a second ground unit (e.g., the second ground unit 271 of FIG. 7), wherein the first metal region is electrically connected to the second printed circuit board, and the third metal region is electrically connected to the first ground unit and the second ground unit.

According to an embodiment of the disclosure, an electrical path may be formed among the first metal region, the second ground unit, the third metal region, and the first ground unit.

According to an embodiment of the disclosure, the electrical path may electrically connect the first metal region and the first ground unit, and the first ground unit may be configured as a ground of the electrical path.

According to an embodiment of the disclosure, the electronic device may further include a flexible printed circuit board (e.g., the flexible printed circuit board 231 of FIG. 4) for electrically connecting the display panel and the first printed circuit board.

According to an embodiment of the disclosure, the third metal region may be positioned to be spaced apart from the first metal region and the second metal region, and the first metal region, the second metal region, and the third metal region may be made of the same material.

According to an embodiment of the disclosure, the second printed circuit board may further include a feeding unit (e.g., the feeding unit 272 of FIG. 7) which is operatively connected to the wireless communication circuit and feeds power to the first metal region.

According to an embodiment of the disclosure, the feeding unit may be electrically connected to the first metal region through a first electrical connection unit (e.g., the first electrical connection unit 270a of FIG. 4) and feed power to the first metal region.

According to an embodiment of the disclosure, the third metal region may be electrically connected to the first ground unit directly, or through a second electrical connection unit (e.g., the second electrical connection unit 253a of FIG. 4).

According to an embodiment of the disclosure, the third metal region may be electrically connected to the second ground unit through a third electrical connection unit (e.g., the third electrical connection unit 253b of FIG. 4).

According to an embodiment of the disclosure, the electronic device may further include a switch circuit (e.g., the switch circuit 300 of FIG. 9) configured to electrically connect the third metal region to the second ground unit or an open stub (e.g., the open stub 310 of FIG. 9), and at least one processor (e.g., the processor 400 of FIGS. 11 and 13) configured to be electrically connected to the switch circuit and to control a connection state of the switch circuit.

According to an embodiment of the disclosure, the switch circuit may electrically connect the third metal region to the second ground unit, the open stub, an inductor (e.g., L of FIGS. 11 and 13), or a capacitor (e.g., C of FIGS. 11 and 13).

According to an embodiment of the disclosure, the electronic device may further include a memory (e.g., the memory 410 of FIG. 11) in which connection state information of the switch circuit corresponding to a frequency band of the at least one signal is stored, wherein the at least one processor is configured to control a connection state of the switch circuit based on the connection state information of the switch circuit corresponding to the frequency band of the at least one signal.

According to an embodiment of the disclosure, the at least one processor may be configured to control the switch circuit to connect the third metal region to the second ground unit when the at least one signal is in a first frequency band, and control the switch circuit to connect the third metal region to the open stub when the at least one signal is in a second frequency band.

According to an embodiment of the disclosure, the electronic device may further include a tuner integrated circuit (IC) (e.g., the tuner IC 500 of FIG. 13) configured to electrically connect the at least one processor to a coupler (e.g., the coupler 510 of FIG. 13) for detecting power of a signal transmitted to the first metal region, and electrically connect the at least one processor to the switch circuit.

According to an embodiment of the disclosure, the at least one processor may be configured to control a connection state of the switch circuit based on a change in power of the transmitted signal, the power being detected by the coupler.

According to an embodiment of the disclosure, an electronic device (e.g., the electronic device 200 of FIGS. 2A, 2B, and/or 3) may include a housing (e.g., the housing 201 of FIG. 2A), wherein the housing includes an antenna radiator (e.g., the first metal region 211 of FIG. 3) functioning as a radiator, a metal region (e.g., the second metal region 251 of FIG. 3), and an island metal (e.g., the third metal region 253 of FIG. 3) spaced apart from the antenna radiator and the metal region, a display panel (e.g., the display panel 230 of FIG. 2A) configured to be positioned in the housing and to include a first surface facing a first direction (e.g., 1 of FIG. 2A) and a second surface facing a second direction (e.g., 2 of FIG. 2A), a first printed circuit board (e.g., the first printed circuit board 240 of FIG. 4) configured to be positioned in the second direction of the display panel and to include a first ground unit (e.g., the first ground unit 241 of FIG. 7), a wireless communication circuit (e.g., the communication module 190 of FIG. 1) which is electrically connected to the antenna radiator and is configured to transmit or receive at least one signal having a designated frequency, and a second printed circuit board (e.g., the second printed circuit board 270 of FIG. 4) configured to be positioned in the housing and to include a second ground unit (e.g., the second ground unit 271 of FIG. 7), wherein the antenna radiator is electrically connected to the second printed circuit board, the island metal is electrically connected to the first ground unit and the second ground unit through at least one electrical connection unit, and an electrical path is formed among the antenna radiator, the second ground unit, the island metal, and the first ground unit.

According to an embodiment of the disclosure, the island metal may be made of the same material as those of the antenna radiator and the metal region.

According to an embodiment of the disclosure, the electronic device may include a switch circuit (e.g., the switch circuit 300 of FIG. 11) configured to electrically connect the island metal to the second ground unit, an open stub (e.g., the open stub 310 of FIG. 11), a capacitor (e.g., C of FIG. 11), or an inductor (e.g., L of FIG. 11), and at least one processor (e.g., the processor 400 of FIG. 11) configured to be electrically connected to the switch circuit and to control a connection state of the switch circuit.

According to an embodiment of the disclosure, the electronic device may further include a memory (e.g., the memory 410 of FIG. 11) in which connection state information of the switch circuit corresponding to a frequency band of the at least one signal is stored, wherein the at least one processor is configured to control a connection state of the switch circuit based on the connection state information of the switch circuit corresponding to the frequency band of the at least one signal.

According to an embodiment of the disclosure, the electronic device may further include a tuner integrated circuit (IC) (e.g., the tuner IC 500 of FIG. 13) configured to electrically connect the at least one processor to a coupler (e.g., the coupler 510 of FIG. 13) for detecting power of a signal transmitted to the antenna radiator, and electrically connect the at least one processor to the switch circuit, wherein the at least one processor is configured to control a connection state of the switch circuit based on a change in power of the transmitted signal, the power being detected by the coupler.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a display panel comprising a first surface facing a first direction and a second surface facing a second direction;
    a first printed circuit board configured to be positioned in the second direction of the display panel and to comprise a first ground unit;
    a bracket comprising a first structure which forms a side surface of the electronic device and a second structure which forms a space in which electronic components are mounted, wherein the first structure of the bracket comprises a first metal region operating as a radiator and insulation regions positioned at both ends of the first metal region, and the second structure of the bracket comprises a second metal region, a first non-metal region, and a third metal region extending through one region of the first non-metal region;
    a wireless communication circuit which is electrically connected to the first metal region and is configured to transmit or receive at least one signal having a designated frequency;
    a second printed circuit board comprising a second ground unit;
    a switch circuit configured to electrically connect the third metal region to the second ground unit or an open stub;
    at least one processor configured to be electrically connected to the switch circuit and to control a connection state of the switch circuit; and
    a memory in which connection state information of the switch circuit corresponding to a frequency band of the at least one signal is stored,
    wherein the first metal region is electrically connected to the second printed circuit board,
    wherein the third metal region is electrically connected to the first ground unit and the second ground unit, and
    wherein the at least one processor is further configured to control the connection state of the switch circuit based on the connection state information of the switch circuit corresponding to the frequency band of the at least one signal.

2. The electronic device of claim 1, wherein an electrical path is formed among the first metal region, the second ground unit, the third metal region, and the first ground unit.

3. The electronic device of claim 2, wherein the electrical path electrically connects the first metal region and the first ground unit, and the first ground unit is configured as a ground of the electrical path.

4. The electronic device of claim 1, further comprising a flexible printed circuit board for electrically connecting the display panel and the first printed circuit board.

5. The electronic device of claim 1,
wherein the third metal region is positioned to be spaced apart from the first metal region and the second metal region, and
wherein the first metal region, the second metal region, and the third metal region are made of the same material.

6. The electronic device of claim 1, wherein the second printed circuit board further comprises a feeding unit which is operatively connected to the wireless communication circuit and feeds power to the first metal region.

7. The electronic device of claim 6, wherein the feeding unit is electrically connected to the first metal region through a first electrical connection unit and feeds power to the first metal region.

8. The electronic device of claim 1, wherein the third metal region is electrically connected to the first ground unit directly, or through a second electrical connection unit.

9. The electronic device of claim 8, wherein the third metal region is electrically connected to the second ground unit through a third electrical connection unit.

10. The electronic device of claim 1, wherein the switch circuit electrically connects the third metal region to the second ground unit, the open stub, an inductor, or a capacitor.

11. The electronic device of claim 1, wherein the at least one processor is further configured to:
control the switch circuit to connect the third metal region to the second ground unit when the at least one signal is in a first frequency band, and
control the switch circuit to connect the third metal region to the open stub when the at least one signal is in a second frequency band.

12. The electronic device of claim 1, further comprising a tuner integrated circuit (IC) configured to:
electrically connect the at least one processor to a coupler for detecting power of a signal transmitted to the first metal region, and
electrically connect the at least one processor to the switch circuit.

13. The electronic device of claim 12, wherein the at least one processor is further configured to control a connection state of the switch circuit based on a change in power of the transmitted signal, the power being detected by the coupler.

14. An electronic device comprising:
a housing,
wherein the housing comprises:
an antenna radiator functioning as a radiator, a metal region, and an island metal spaced apart from the antenna radiator and the metal region;
a display panel configured to be positioned in the housing and to comprise a first surface facing a first direction and a second surface facing a second direction;
a first printed circuit board configured to be positioned in the second direction of the display panel and to comprise a first ground unit;
a wireless communication circuit which is electrically connected to the antenna radiator and is configured to transmit or receive at least one signal having a designated frequency; and
a second printed circuit board configured to be positioned in the housing and to comprise a second ground unit;
a switch circuit configured to electrically connect the island metal to the second ground unit, an open stub, a capacitor, or an inductor;
at least one processor configured to be electrically connected to the switch circuit and to control a connection state of the switch circuit; and
a memory in which connection state information of the switch circuit corresponding to a frequency band of the at least one signal is stored,
wherein the antenna radiator is electrically connected to the second printed circuit board,
wherein the island metal is electrically connected to the first ground unit and the second ground unit through at least one electrical connection unit,
wherein an electrical path is formed among the antenna radiator, the second ground unit, the island metal, and the first ground unit, and
wherein the at least one processor is further configured to control a connection state of the switch circuit based on the connection state information of the switch circuit corresponding to the frequency band of the at least one signal.

15. The electronic device of claim 14, wherein the island metal is made of the same material as those of the antenna radiator and the metal region.

16. The electronic device of claim 14, further comprising a tuner integrated circuit (IC) configured to:
electrically connect the at least one processor to a coupler for detecting power of a signal transmitted to the antenna radiator, and
electrically connect the at least one processor to the switch circuit,
wherein the at least one processor is further configured to control a connection state of the switch circuit based on a change in power of the transmitted signal, the power being detected by the coupler.

* * * * *